United States Patent [19]
Ishii

[11] Patent Number: 5,703,839
[45] Date of Patent: Dec. 30, 1997

[54] MAGNETIC HEAD FOR MAGNETOOPTICAL RECORDING APPARATUS

[75] Inventor: Kazuyoshi Ishii, Tokyo, Japan

[73] Assignee: Canon Kabushiki Kaisha, Tokyo, Japan

[21] Appl. No.: 489,458

[22] Filed: Jun. 12, 1995

[30] Foreign Application Priority Data

Jun. 14, 1994 [JP] Japan .................................. 6-131849
May 26, 1995 [JP] Japan .................................. 7-127828

[51] Int. Cl.$^6$ .................................................. G11B 11/00
[52] U.S. Cl. .............................. 369/13; 360/114; 360/103
[58] Field of Search ........................ 369/13, 14; 300/114, 300/102, 103, 104, 109, 122, 123, 125, 127

[56] References Cited

U.S. PATENT DOCUMENTS 5,383,075 1/1995 Uchida et al. ............................ 360/122
5,386,400 1/1995 Nakayama et al. ...................... 369/13
5,402,293 3/1995 Smith ....................................... 360/114

FOREIGN PATENT DOCUMENTS 6-301914 10/1994 Japan.

OTHER PUBLICATIONS

Oshiki et al "A Thin Film Head for Perpendilular Magnetic Recording," American Institute of Physics, Mar. 1982.

*Primary Examiner*—Tan Dinh
*Attorney, Agent, or Firm*—Fitzpatrick, Cella, Harper & Scinto

[57] ABSTRACT

A magnetic head for magnetooptical recording is provided with a slider base, a core made of a magnetic material, and a coil composed of a spiral thin film conductor. The core is mounted on the slider base and has a main pole. A thin plate-shaped cover member is provided to surround the main pole while exposing the upper end face thereof. The cover member is composed of an antiabrasive material. An air bearing face or a sliding face is formed on the surface of the cover member. The coil is formed on the rear surface of the cover member.

16 Claims, 19 Drawing Sheets

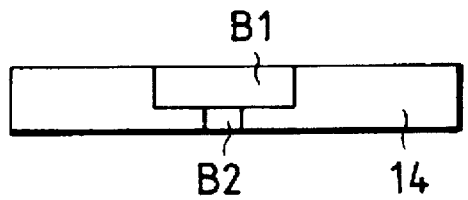
FIG. 13A
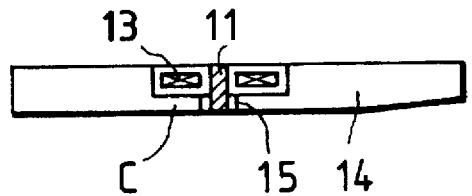
FIG. 13E
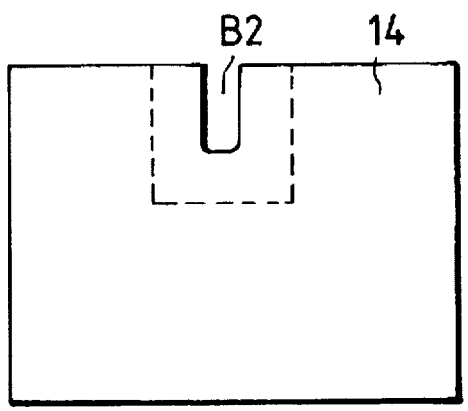
FIG. 13B
FIG. 13C
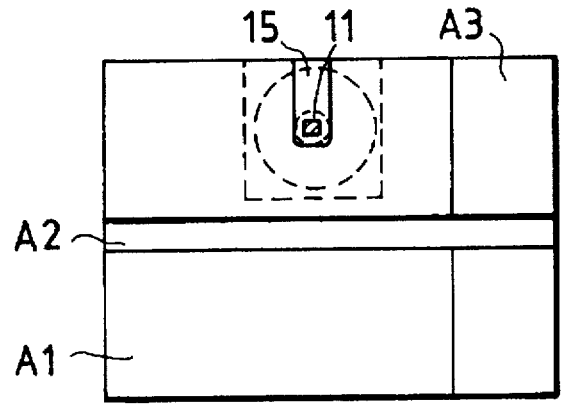
FIG. 13F
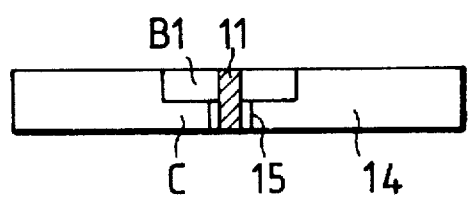
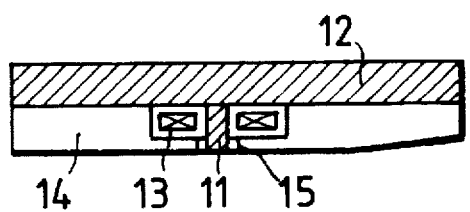
FIG. 13G
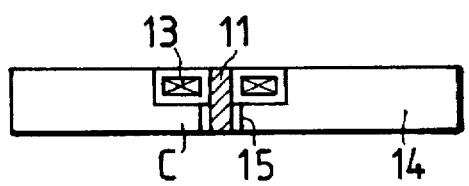
FIG. 13D

5,703,839

MAGNETIC HEAD FOR MAGNETOOPTICAL RECORDING APPARATUS

BACKGROUND OF THE INVENTION

1. Field of the Invention

The present invention relates to a magnetic head for magnetooptical recording, for recording an information signal on a magnetooptical recording medium, and a method for making the same, and a magnetooptical recording apparatus.

2. Related Background Art

In the magnetooptical recording apparatus for high density recording of an information signal on a magnetooptical recording medium such as a magnetooptical disk, there is already known the magnetic field modulation process in which an information signal is recorded by irradiating the recording medium with a laser beam converged to a light spot having a diameter of about 1 micron, and applying a magnetic field, modulated with the information signal, by a magnetic head to the irradiated position of said laser beam.

FIG. 2 is a schematic view of a conventional magnetooptical recording apparatus of the magnetic field modulation process.

A disk 7, employed as the magnetooptical recording medium, is composed of a magnetic recording layer 7a formed on a transparent substrate, and is rotated by a spindle motor 6. A magnetic head 1 is positioned above the disk 7, and an optical head 5 is provided below the disk 7, in opposed relationship to the magnetic head 1. The magnetic head 1 is supported at the front end of a load beam 2, of which fixed end is connected with the optical head 5 by a connecting member 3, whereby the optical head 5 and the magnetic head 1 are integrally moved, by a linear motor 4, in the radial direction of the disk 7.

At the information signal recording on the disk 7 in the above-explained magnetooptical recording apparatus, the disk 7 is rotated at a high speed by the spindle motor 6, and the optical head irradiates the magnetic recording layer 7a of the disk 7 with a laser beam 8 condensed to a light spot having a diameter of about 1 micron, whereby the irradiated portion of the magnetic recording layer 7a is heated to the Curie temperature or higher.

At the same time, a current modulated with the information signal is supplied from a magnetic head drive circuit 9 to a coil of the magnetic head 1, whereby a magnetic field modulated with the information signal is applied to the portion irradiated with the light spot. Thus, on the magnetic recording layer 7a which has passed the portion irradiated with the light spot and has then been cooled, the information signal is recorded by the magnetization corresponding to the direction of the applied magnetic field.

The above-mentioned magnetic head 1 is provided, as shown in FIGS. 1A and 1B, with a core 18 consisting of a square base core 18a composed of a magnetic material of a high magnetic permeability such as ferrite and a main pole 18b integrally protruding from the center of the base core, a coil 13 consisting of a conductor wound on the base core 18a and around the main pole 18b, and a slider base 14 composed of an antiabrasive, non-magnetic material such as ceramics, and provided with an air bearing structure for maintaining the magnetic head in a floating state by the air flow generated by the rotation of the disk. A protecting member 19, consisting of thermosetting resin such as epoxy resin, for protecting the coil 13 and the main pole 18b is filled around the coil 13 and the main pole 18b in such a manner that the surface of the protecting member 19 aligns with the air bearing surface A1 of the slider base 14 and that the upper end face 18c of the main pole 18b is exposed to the surface of the air bearing surface A1.

Also, there is known an apparatus in which the magnetic head is maintained in sliding contact with the disk, instead of the above-explained example in which the magnetic head floats above the disk, and, in such a case, the slider base is provided with a sliding face instead of the air bearing face, but, also in such a case, the entire structure of the apparatus is identical with that in the above-explained example.

Such a magnetic head is provided, as shown in FIGS. 3A and 3B, with a coil 13 provided around a core 18 consisting of a magnetic material of a high magnetic permeability such as ferrite and having a main pole 18b protruding integrally from the center of a square base core 18a, and a sliding member 17 consisting of a resinous material with a lubricating property and having a curved sliding face A4 for sliding contact with the surface of the disk. Also, a protecting member 19 consisting of thermosetting resin such as epoxy resin is filled around the coil 13 and the main pole 18b for protecting the same, in such a manner that the surface of the protecting member aligns with the sliding face A4 of the sliding member 17.

In such a magnetic head as shown in FIGS. 1A and 1B or 3A and 3B, if the coil is formed flat and parallel to the air bearing face or the sliding face and is provided close thereto, the coil will have a smaller inductance and the magnetic head will have a higher magnetic field generating efficiency, whereby the signal recording can be achieved at a higher speed in a more satisfactory manner.

Also, U.S. Pat. No. 5,402,293 proposes to form the coil with a thin film conductor in order to enhance the above-mentioned effects. In such a magnetic head, the coil is conventionally formed by patterning, in a spiral form, a thin film conductor formed on the base core, for example, by a plating method. Also, in this example, no protective member is provided on the coil.

Also, Japanese Patent Laid-open Application No. 6-301914 proposes a method of forming a flat coil by winding a conductor wire. There are disclosed a method of mounting a preformed flat coil around the main pole protruding from the base core, and a method of forming a flat coil by directly winding a conductor wire around the main pole protruding from the base core. According to the investigation of the present applicant, the above-mentioned method of mounting the preformed flat coil is superior in the productivity.

However, the conventional apparatus explained above is associated with the following drawbacks. As the protecting member consisting of the thermosetting resin not sufficient in hardness and abrasion resistance is exposed on the air bearing face, the surface of such a protecting member may get damaged in case when a dust particle or the like is included between the air bearing face and the disk surface or in a case when the magnetic head loses the floating stability and temporarily contacts the disk when the magnetic head is subjected to an excessively large acceleration, for example, by a high-speed seek operation or by an external vibration.

Such damage, if severe, may cause the head to crash, eventually leading to the destruction of the disk and the magnetic head.

Also, the magnetic head provided with the sliding member maintained in sliding contact with the disk may be easily destroyed by the large frictional force in the contact between the magnetic head and the disk, if the non-lubricating member, such as the aforementioned protecting member of the thermosetting resin is exposed in the sliding contact portion with the disk.

Also, in the magnetic head in which the coil is formed by the thin film conductor deposited on the base core, it is made possible to increase the adhesion strength of the thin film and to achieve precise coil patterning, by polishing the surface of the base core sufficiently smooth prior to the formation of the thin film conductor. However, in the above-explained conventional magnetic core, when the base core has a protruding portion such as the main pole, the polishing work of the base core surface is very difficult and is not suitable for mass production.

Also, in the magnetic head in which the flat coil, preformed with a conductor wire, is mounted around the main pole protruding from the base core, in providing the protecting member with an antiabrasive material such as ceramics on the coil by glass bonding, after the coil mounting in the manufacture, the coil cannot withstand the softening point (about 500° C.) of glass. For this reason, the protecting member is composed of thermosetting resin which does not require such a high temperature, but such a material is not sufficient in hardness and in abrasion resistance as already mentioned in the foregoing.

SUMMARY OF THE INVENTION

An object of the present invention is to minimize or to completely eliminate the exposed surface of the protecting member consisting of thermosetting resin or the like, by providing a cover member with sufficient hardness and abrasion resistance on the air bearing face or the sliding face of the magnetic head, thereby protecting the magnetic head from damage or destruction resulting from the dust or the like.

Another object of the present invention is to improve the productivity in case a flat coil is formed by the thin film conductor.

Still another object of the present invention is to enable, in case a flat coil is formed with a conductor wire, adhesion by glass bonding of a cover member sufficient in abrasion resistance.

The magnetic head of the present invention for magnetooptical recording, provided with a slider base, a core of a magnetic material mounted on said slider base and a coil provided around a main pole of said core, is featured by a fact that a cover member of thin plate shape, consisting of an antiabrasive material, is so provided as to surround the main pole while exposing the upper end face thereof and that said cover member constitutes an air bearing face or a sliding face on the surface thereof and bears, on the rear surface thereof, against said coil formed by a spiral thin film conductor.

Also, the magnetic head of the present invention for magnetooptical recording, provided with a slider base, a core of a magnetic material mounted on said slider base and a coil provided around a main pole of said core, is featured by a fact that a cover member of thin plate shape, consisting of an antiabrasive material, is so provided as to cover the upper end face of the main pole and that said cover member constitutes an air bearing face or a sliding face on the surface thereof and bears, on the rear surface thereof, against said coil formed by a spiral thin film member.

The above-mentioned cover member, being designed to reduce the exposed area of the protecting member or the adhesive material, consisting, for example, of thermosetting resin with a low abrasion resistance, prevents the abrasion of or damage to the air bearing face or the sliding face. Also, the productivity can be improved by the formation of the coil with the thin film conductor on the cover member, instead of the base core.

The slider base and the spacer can be composed of a metal such as copper or aluminum.

The magnetic material integrally constituting the slider base and the core is preferably ferrite or the like.

The cover member is conveniently composed of an antiabrasive material, such as a ceramic material containing $Al_2O_3$, $TiO_2$, $ZrO_2$, BaO, CaO, NiO, MnO, MgO $SiO_2$, SiC, TiC, SiN, TiN, BN etc., for example BaO—$TiO_2$, CaO—$TiO_2$, $Al_2O_3$—TiC or $ZrO_2$—$SiO_2$, non-magnetic ferrite or glass-like carbon.

Also, the cover member may be composed of different materials for the top and rear surfaces thereof. For example, the top surface of the cover member, for constituting the air bearing face or the sliding face may be composed of an antiabrasive material such as CaO—$TiO_2$ or $Al_2O_3$—TiC, while the rear surface for bearing the coil with the thin film conductor may be composed of a material suitable for plating and patterning of metal thereon, such as $Al_2O_3$.

Also, the magnetic head of the present invention for magnetooptical recording is featured by a fact that it comprises a core composed of plural members including a main pole consisting of a magnetic material and a base core consisting of a magnetic material and adhered to said main pole in such a manner that an end of said pole protrudes, a coil provided around the protruding portion of the main pole, and a non-magnetic cover member having an antiabrasive or a lubricating property and provided around said protruding portion so as to cover the surface of the coil.

It is furthermore featured by a fact that said cover member is integrally constituted with a slider with the air bearing structure or with a sliding member.

Also, the magnetic head of the present invention for magnetooptical recording is produced by a method comprising a first step for adhering the main pole to the cover member, a second step for providing the coil around the protruding portion of the main pole, and a third step for adhering the main pole with the base core, wherein said steps are executed in the above-mentioned sequential order.

Also, the magnetic head of the present invention for magnetooptical recording is produced by a method comprising a first step for adhering the main pole to the cover member constituted integrally with the slider or the sliding member, a second step for providing the coil around the protruding portion of the main pole, and a third step for adhering the main pole with the base core, wherein said steps are executed in the above-mentioned sequential order.

Also, the magnetooptical recording apparatus of the present invention is featured by a fact that it comprises the above-mentioned magnetic head for magnetooptical recording, means for causing a relative movement of said magnetic head for magnetooptical recording and a magnetooptical recording medium, means for causing said magnetic head to generate a magnetic field modulated with the information signal, and an optical head for irradiating the generated portion of the magnetic field with a condensed laser beam.

According to the present invention, because of the presence of the cover member having an antiabrasive or a lubricating property and so positioned as to cover the coil surface, a member with insufficient antiabrasive or lubricating property is not exposed, in contrast to the conventional magnetic head, on the air bearing face or the sliding face, so that the destruction of the magnetic head can be prevented.

BRIEF DESCRIPTION OF THE DRAWINGS

FIGS. 13A to 13G are views showing a method for producing the magnetic head for magnetooptical recording shown in FIGS. 12A and 12B;

DETAILED DESCRIPTION OF THE PREFERRED EMBODIMENTS

Now, the present invention will be discussed in detail with respect to the preferred embodiments thereof with reference to the attached drawings.

[Embodiment 1]

Figure 4A:
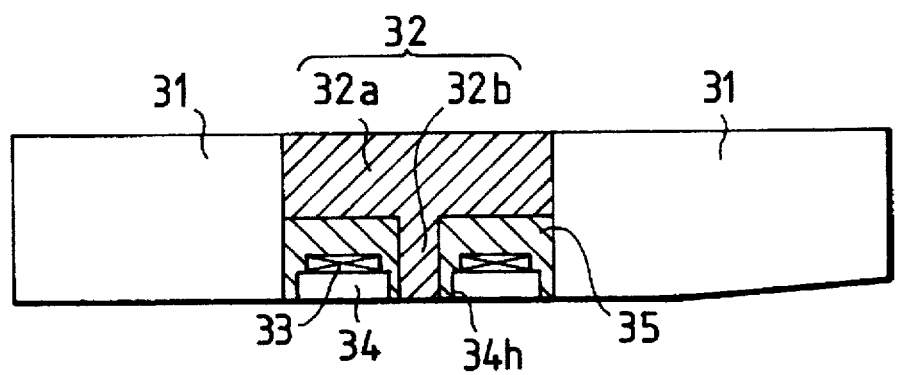
FIGS. 4A and 4B are views of a first embodiment of the magnetic head of the present invention for magnetooptical recording.
Figure 4B:
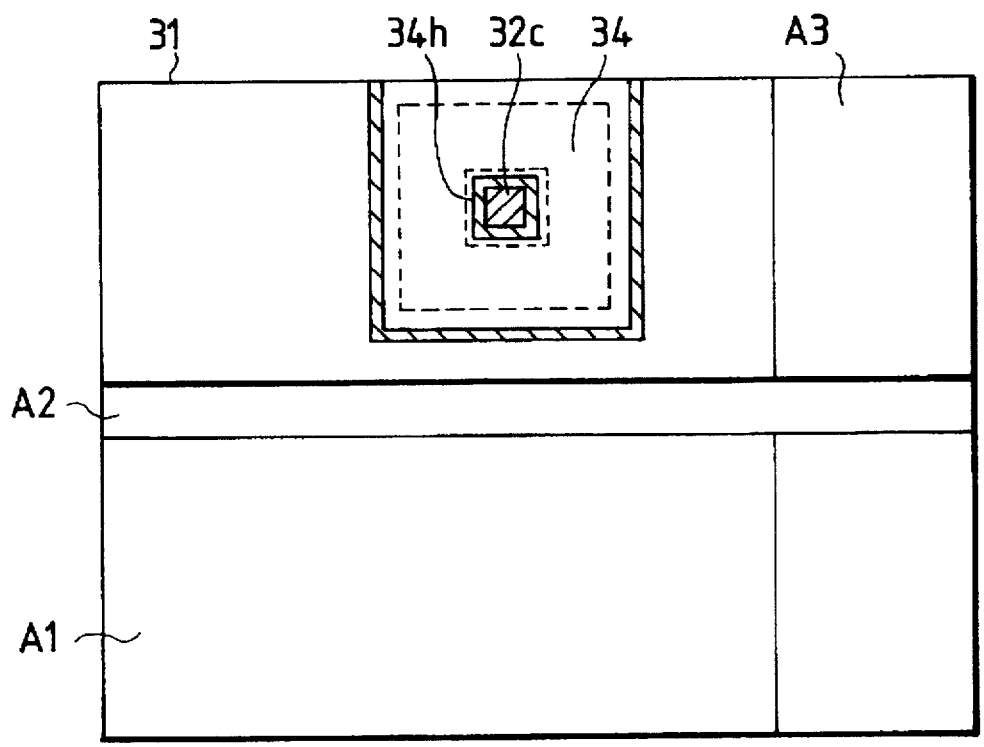

FIGS. 4A and 4B show the configuration of a magnetic head for magnetooptical recording, constituting a first embodiment of the present invention, wherein provided are a slider base 31 composed of an antiabrasive ceramic material; and a core 32 composed of a magnetic material such as ferrite and fixed to the slider base 31. The core 32 is composed of a square base core 32a and a main pole 32b protruding from the central portion of the base core 32a.

Figure 5:
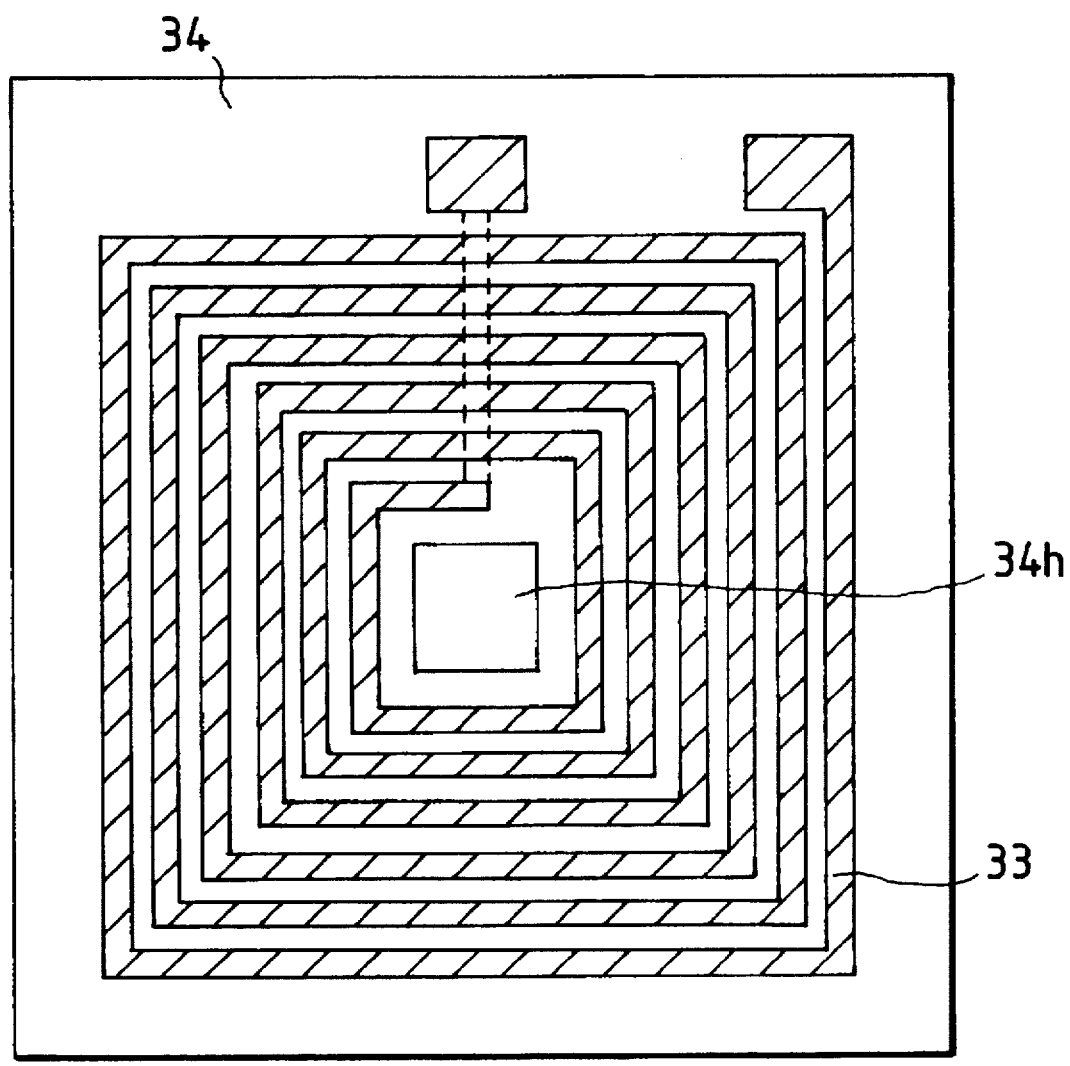
FIG. 5 is a view showing the configuration of a cover member in the first embodiment.

There is also provided a rectangular cover member 34 of thin plate shape, composed of an antiabrasive non-magnetic ceramic material and so shaped as to surround the main pole 32b, with a central hole 34h for exposing an upper end face 32c of the main pole. On the rear face of the cover member 34, a coil 33 is formed by a thin film conductor of spiral shape, surrounding the hole 34h as shown in FIG. 5. The above-mentioned coil is prepared by a thin film forming technology such as plating or sputtering and a patterning technology such as etching.

In FIG. 5, the coil 33 is composed of a layer of a thin film conductor, but it may also be composed of two or more layers of thin film conductors with an insulating layer therebetween.

The core and the cover member 34 are fixed by filling the gap therebetween with adhesive material 35, for example, of thermosetting resin.

The bottom face of the slider base 31 is subjected, together with the surface of the cover member 34, to mirror finish polishing thereby constituting an air bearing face A1, and an air bearing structure is completed by the formation of a groove A2 and a chamfered face A3.

In the present embodiment, surrounding the main pole, there is provided the cover member of antiabrasive ceramic material, which bears against the coil, consisting of the spiral thin film conductor, on the rear surface thereof, and constitutes the air bearing face on the top surface. The exposure of the thermosetting resin, employed as the adhesive material, to the air bearing face can be minimized by sufficiently decreasing the gap between the cover member and the slider base and between the cover member and the main pole.

Also, the formation of the coil by the spiral thin film conductor on the rear surface of the cover member enables compactization in comparison with the coil formation by wire winding. Also, such a more compact coil positioned sufficiently close to the front end of the main pole enables generation of a stronger magnetic field with a smaller current supply to the coil, whereby the power consumption in the magnetic coil driving circuit can be reduced. Furthermore, a lower coil inductance, achieved by the compactization of the coil, enables modulation of the magnetic field with a higher frequency, thereby increasing the signal recording rate. Furthermore, the coil is not formed on the base core 22, but on the rear surface of the cover member, which is free from any protruding portion and can therefore be polished easily in advance, so that the productivity can be improved.

[Embodiment 2]

Figure 6A:
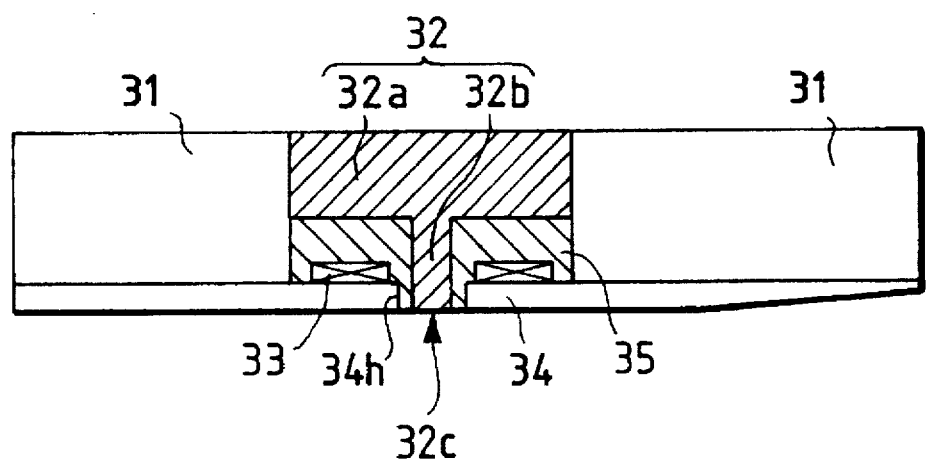
FIGS. 6A and 6B are views of a second embodiment of the magnetic head of the present invention for magnetooptical recording.
Figure 6B:
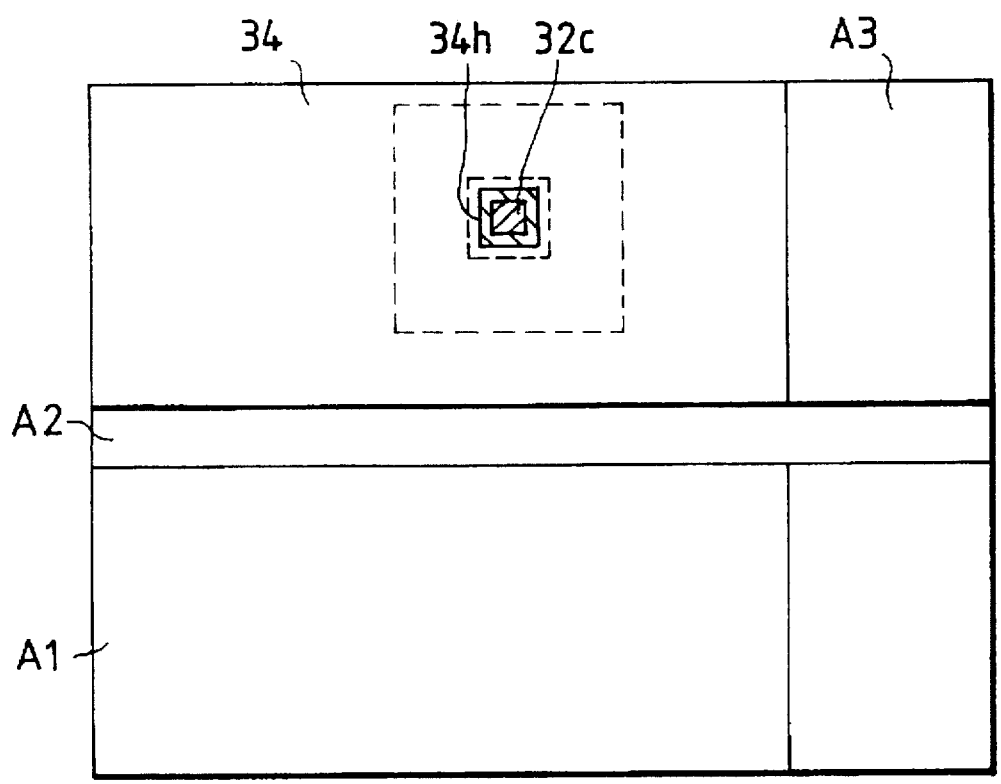

FIGS. 6A and 6B show the configuration of a magnetic head for magnetooptical recording, constituting a second embodiment of the present invention. A slider base 31 in this embodiment need not necessarily be composed of an antiabrasive material, for the reason to be explained later, but can be composed of a metallic or resinous material. A core 32, fixed to the slider base 31 and composed of a magnetic material such as ferrite, is composed of a rectangular base core 32a and a main pole 32b protruding from the central portion of the base core 32a.

A rectangular cover member 34 of thin plate shape, composed of an antiabrasive non-magnetic ceramic material is so provided as to surround the main pole 32b and to cover the entire bottom face of the slider base 31, with a central hole 34h for exposing the upper end face 32c of the main pole. On the rear surface of the cover member 34, a coil 33 is formed by a thin film conductor of spiral shape, surrounding the hole 34h. The core 32 and the cover member 34 are fixed by filling the gap therebetween with adhesive material 35, for example, of thermosetting resin.

The surface of the cover member 34 is subjected to mirror finish polishing to form an air bearing face A1, and an air bearing structure is completed by the formation of a groove A2 and a chamfered face A3.

In the present embodiment, the cover member of antiabrasive ceramic material is so provided as to surround the main pole and to cover the coil surface and the entire bottom face of the slider base, and the air bearing face is formed on the surface of the cover member. The exposure of the thermosetting resin, employed as the adhesive material, to the air bearing face can be minimized by sufficiently decreasing the gap between the cover member and the main pole.

In the present embodiment, the bottom face of the slider base is not subjected to abrasion or damage, as it is not exposed to the air bearing face. Consequently, the slider base need not be composed of an antiabrasive material, and it can be manufactured easily with a lower cost if it is composed of a metallic or resinous material with a satisfactory working or molding property.

Besides, if it is composed of a metallic material with a satisfactory thermal conductivity such as copper or aluminum, heat generated in the core and the coil in generating a modulated magnetic field of high frequency can effectively be dissipated, whereby deterioration of the magnetic characteristics resulting from the temperature rise in the core is prevented.

[Embodiment 3]

Figure 7A:
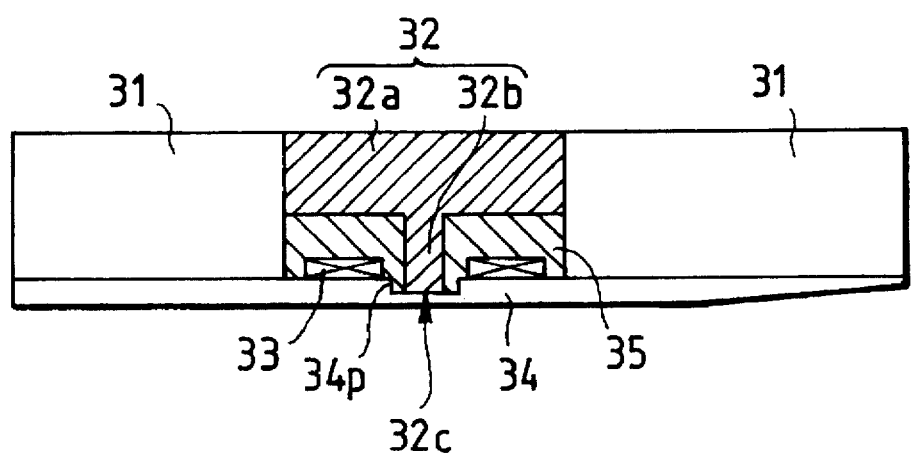
FIGS. 7A and 7B are views of a third embodiment of the magnetic head of the present invention for magnetooptical recording.
Figure 7B:
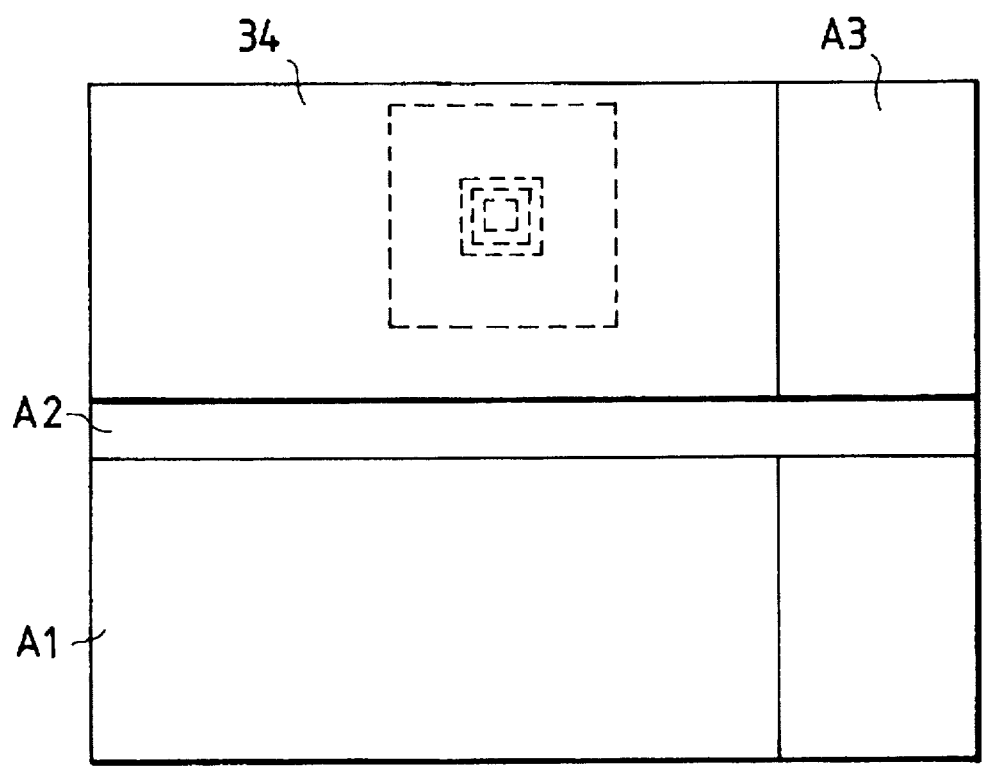

FIGS. 7A and 7B show the configuration of a magnetic head for magnetooptical recording, constituting a third embodiment of the present invention, wherein a slider base 31, a core 32 and a coil 33 are constructed in the identical manner as in the foregoing second embodiment.

A rectangular thin cover member 34 of an antiabrasive non-magnetic ceramic material is so provided as to cover the upper end face 32c of the main pole and the entire bottom face of the slider base 31. On the rear surface of the cover member there is formed a recess 34p, in which the upper end face 32c of the main pole is positioned thereby sufficiently reducing the gap to the top surface of the cover member 34. On the rear surface of the cover member 34, there is formed a coil 33 by a thin film conductor of spiral shape, surrounding the recess 34p.

The core 32 and the cover member 34 are fixed by filling the gap therebetween with adhesive material 35, for example, of thermosetting resin.

The surface of the cover member 34 is mirror polished to form an air bearing face A1, and an air bearing structure is completed by the formation of a groove A2 and a chamfered face A3.

In the present embodiment, the cover member of antiabrasive ceramic material is so provided as to cover the upper end face of the main pole and the entire bottom face of the slider base, and the air bearing face is formed on the surface of the cover member. Consequently, the main pole and constituents, other than the cover member, are not exposed on the air bearing face.

[Embodiment 4]

Figure 8A:
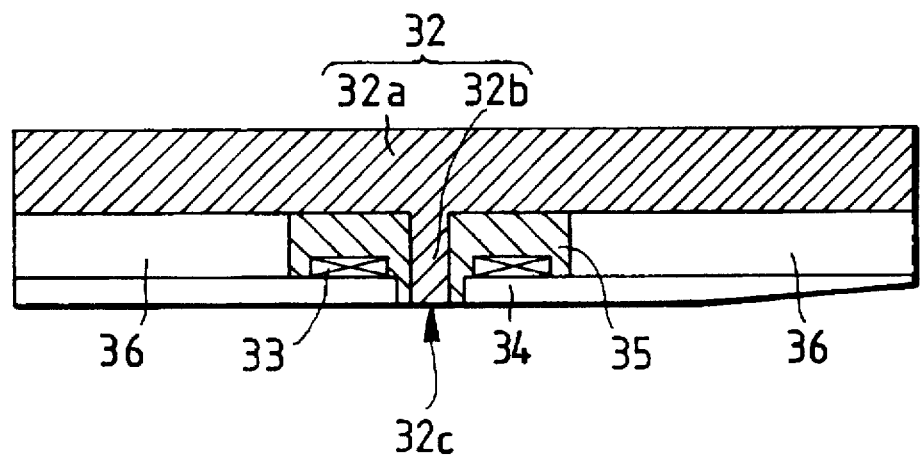
FIGS. 8A and 8B are views of a fourth embodiment of the magnetic head of the present invention for magnetooptical recording.
Figure 8B:
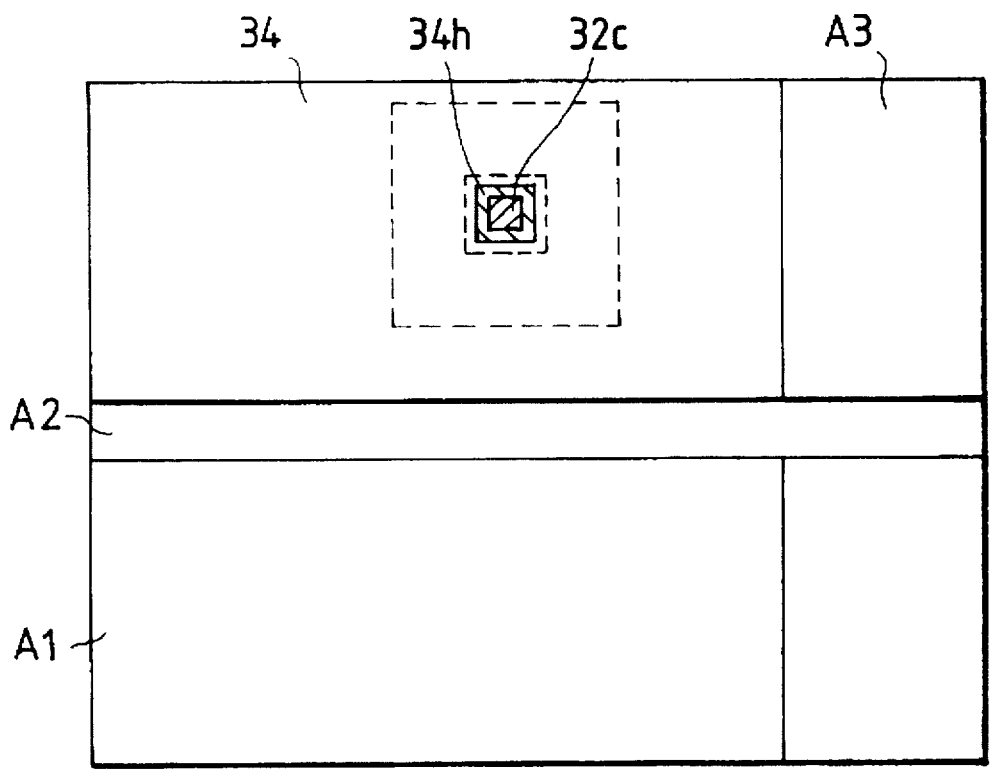

FIGS. 8A and 8B show the configuration of a magnetic head for magnetooptical recording, constituting a fourth embodiment of the present invention. A core 32, composed of a magnetic material such as ferrite, consists of a rectangular base core 32a and main pole 32b protruding from a part of the base core 32a. In the present embodiment, the base core 32a is made sufficiently large, so as to support the other members, whereby the base core 32a also serves as the slider base in the foregoing embodiments. Thus, the slider base and the core are integrally constructed with the magnetic material. Also, a spacer 36 is provided between the base core 32a and the cover member 34. Furthermore, a rectangular thin cover member 34, composed of an antiabrasive non-magnetic ceramic material, is so provided as to surround the main pole 32b and to cover the surface of the spacer 36, with a hole 34h for exposing the upper end face 32c of the main pole. On the rear surface of the cover member 34, a coil 33 is formed by a thin film conductor of spiral form, surrounding the hole 34h. The core 32 and the cover member 34 are fixed by filling the gap among the core 32, cover member 34 and spacer 36 with adhesive material 35 composed, for example, of thermosetting resin. The spacer 36 is composed of a metallic or resinous material.

The surface of the cover member 34 is mirror polished to form an air bearing face A1, and an air bearing structure is completed by the formation of a groove A2 and a chamfered face A3.

In the present embodiment, the cover member of antiabrasive non-magnetic ceramic material is so provided as to surround the main pole and to cover the surface of the spacer, and the air bearing face is formed on the surface of the cover member. The exposure of the thermosetting resin, employed as the adhesive material, to the air bearing face can be minimized by sufficiently decreasing the gap between the cover member and the main pole.

Also, in the present embodiment, the bottom face of the spacer 36 is not subjected to abrasion or damage, because it is not exposed to the air bearing face. For this reason, the spacer need not be composed of an antiabrasive material. Therefore, if the spacer is made of a metallic or resinous material which is easily workable or moldable, there can be obtained advantages of easier manufacturing and lower cost. Furthermore, in a case when it is composed of a metallic material of satisfactory thermal conductivity such as copper or aluminum, there can be effectively dissipated the heat generated in the coil and the core in generating a modulated magnetic field of a high frequency, whereby attained is an advantage of preventing the deterioration in the magnetic characteristics resulting from the temperature rise in the core.

[Embodiment 5]

Figure 9A:
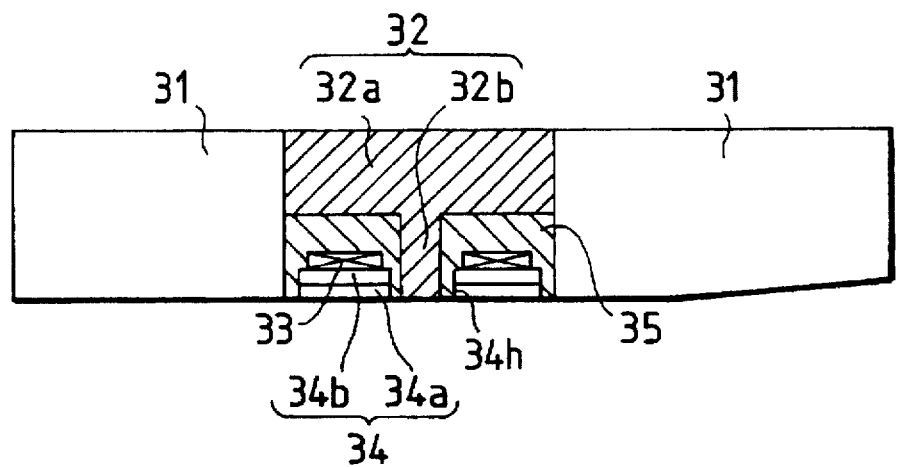
FIGS. 9A and 9B are views of a fifth embodiment of the magnetic head of the present invention for magnetooptical recording.
Figure 9B:
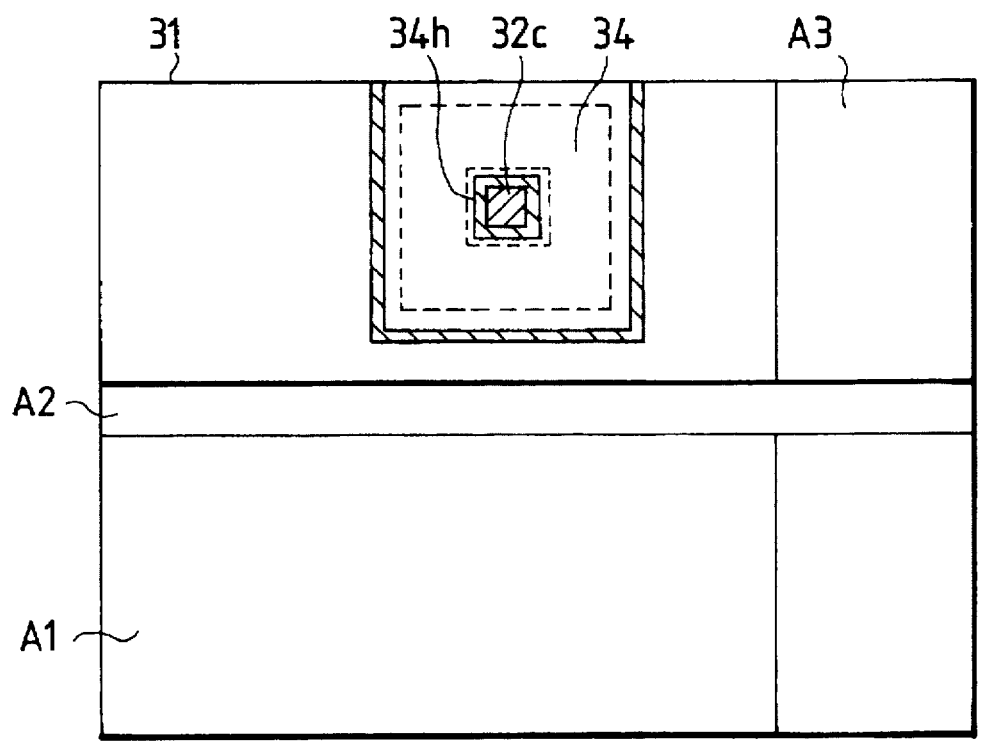

FIGS. 9A and 9B show the configuration of a magnetic head for magnetooptical recording, constituting a fifth embodiment of the present invention, wherein the slider base 31 and the core 32 are similar to those in the foregoing first embodiment.

In the present embodiment, a member 34a constituting the top surface side of the cover member 34 is composed of an antiabrasive ceramic material such as CaO—TiO$_2$ or Al$_2$O$_3$—TiC, while a member 34b constituting the rear surface side is composed of a material suitable for coil formation thereon by metal plating and patterning, such as Al$_2$O$_3$.

The properties required for the respective surfaces of the cover member can be both satisfied by constituting the top surface side and the rear surface side thereof with different materials as explained above. Consequently, there can be obtained a magnetic head with satisfactory coil productivity and with satisfactory abrasion resistance.

Figure 1A:
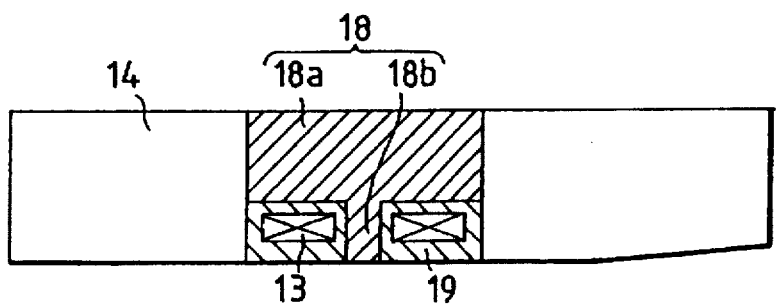
FIGS. 1A and 1B are views of a conventional magnetic head for magnetooptical recording.
Figure 1B:
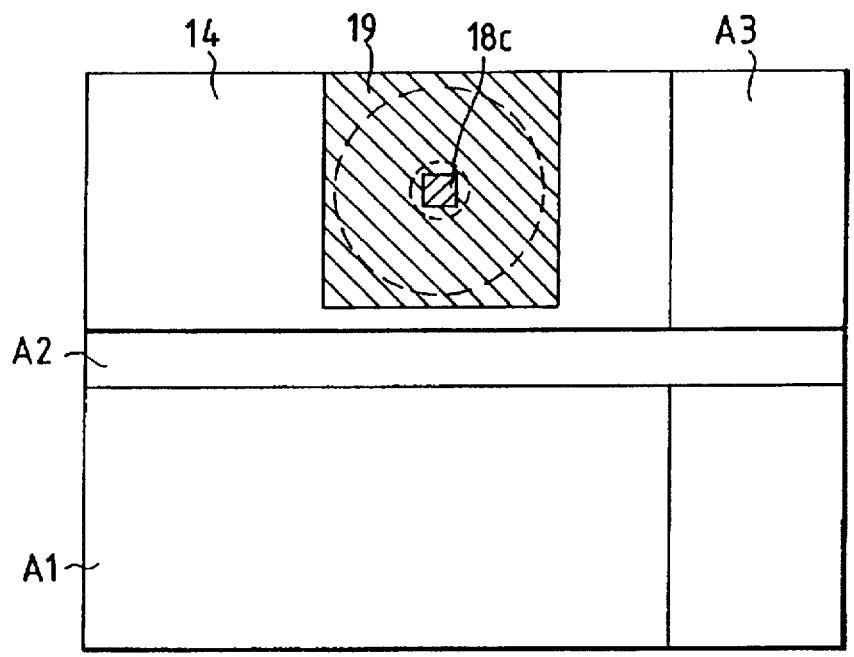
Figure 2:
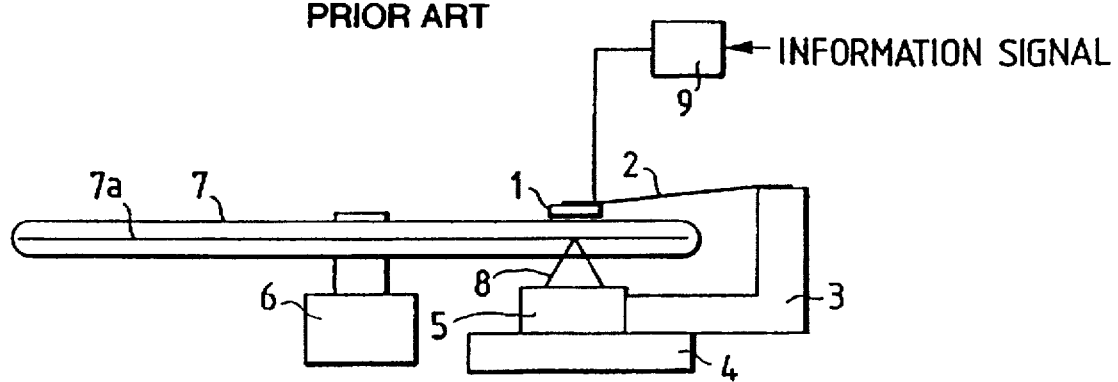
FIG. 2 is a schematic view of a magnetooptical recording apparatus.
Figure 3A:
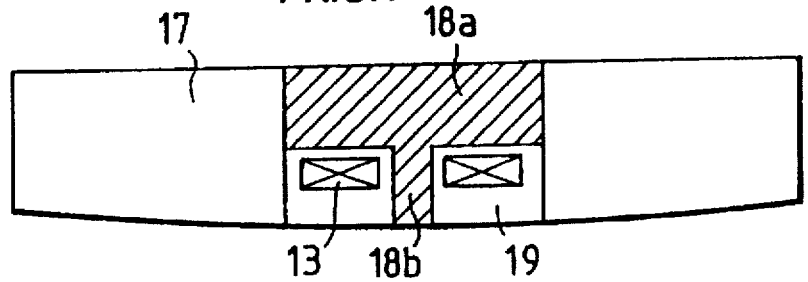
FIGS. 3A and 3B are views of a conventional magnetic head for magnetooptical recording.
Figure 3B:
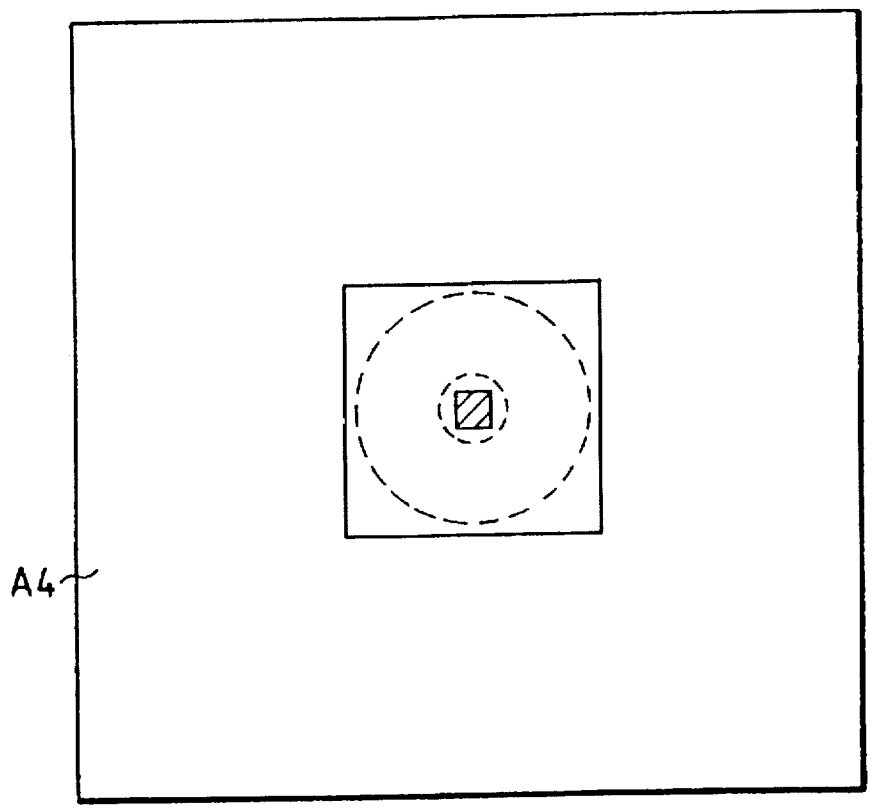

By incorporating the magnetic head for magnetooptical recording of each of the foregoing embodiments into a magnetooptical recording apparatus similar to the conventional one explained in FIG. 2, thereby constituting a magnetooptical recording apparatus provided with means for causing relative motion of the magnetic head of the present invention and a magnetooptical recording medium, means for generating a magnetic field, modulated with the information signal, by said magnetic head for magnetooptical recording, and an optical head for irradiating the generated portion of the magnetic field with a condensed laser beam, it is rendered possible to more securely prevent the damage to or destruction of the magnetic head.

The foregoing embodiments are all applied to the magnetic head of a type floating by the air flow on the disk, but the present invention is applicable also, to the magnetic head of a type in sliding contact with the disk and the magnetooptical recording apparatus utilizing the same. In such a case, the magnetic head is provided with a sliding face instead of the air bearing face.

[Embodiment 6]

Figure 10A:
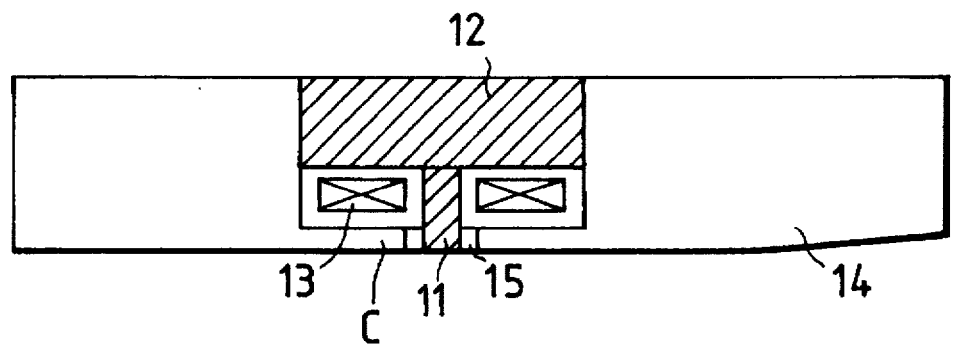
FIGS. 10A and 10B are views of a magnetic head of the present invention for magnetooptical recording.
Figure 10B:
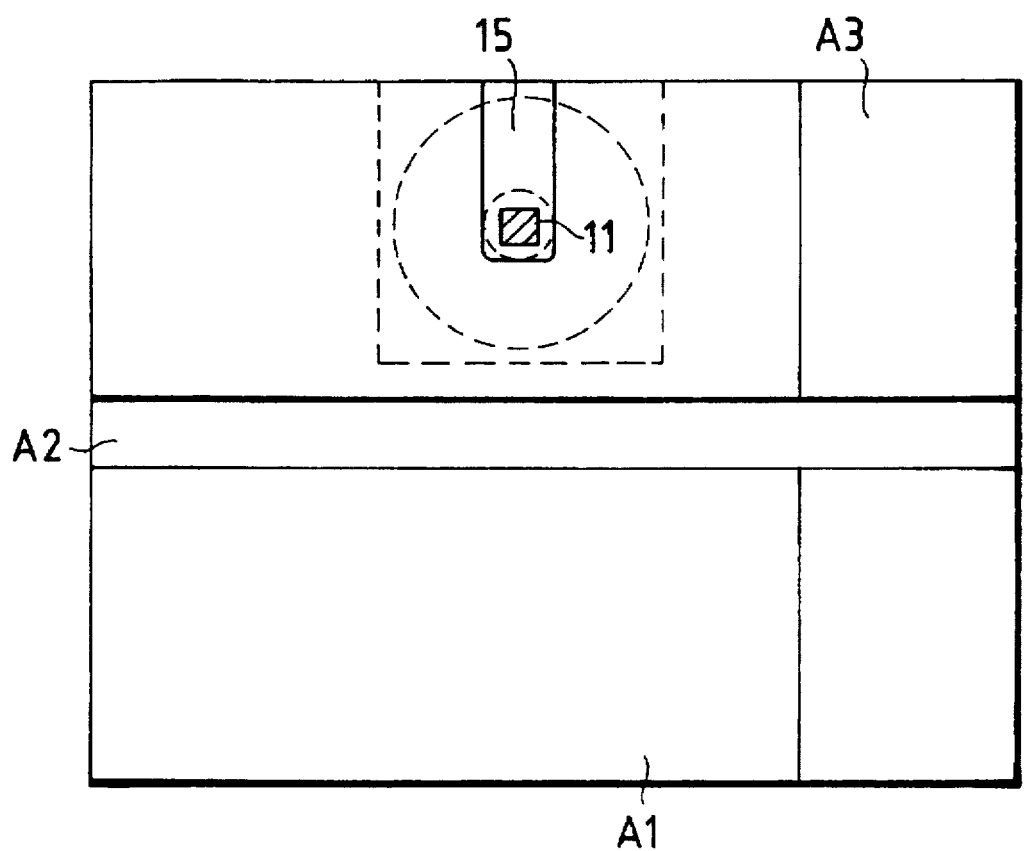

FIGS. 10A and 10B are respectively a schematic cross-sectional view and a plan view, seen from below, showing another embodiment of the magnetic head of the present invention for magnetooptical recording.

In these drawings, there are a rectangular plate-shaped base core 12 composed of a magnetic material of a high magnetic permeability, and a square pillar-shaped main pole 11 adhered to the central portion of the base core 12 so as to protrude therefrom. The core mounted on the slider base is composed of the base core 12 and the main pole 11. Around the protruding portion of the main pole 11 there is provided a coil 13 formed by winding a conductor wire. A slider 14 is composed of an antiabrasive non-magnetic ceramic material. The bottom surface of the slider 14 is provided with an air bearing structure, including a mirror-finished air bearing face A1 for causing the magnetic head to float by air flow, a groove A2 and a chamfered face A3. In this manner, the core is formed by adhering plural members consisting of the magnetic material of a high magnetic permeability.

Also, around the protruding portion of the main pole 11, a cover C is formed integrally with the slider 14 so as to cover the coil 13, and is bonded to the main pole 11 with glass 15.

In the following, there will be explained the method of producing the magnetic head of the above-explained structure. As explained above, the cover and the main pole are bonded with glass, of which the softening temperature is usually above several hundred degrees. As the coil can only withstand a temperature up to 120° C. to 180° C., the step of providing the coil around the main pole has to be conducted after the bonding step of the cover and the main pole. Also, in order to fit a preformed hollow coil around the main pole, it is necessary to constitute the core with at least two members, i.e., the base core and the main pole, and to execute the bonding step of the base core and the main pole after the coil fitting step around the main pole.

Figure 11A:
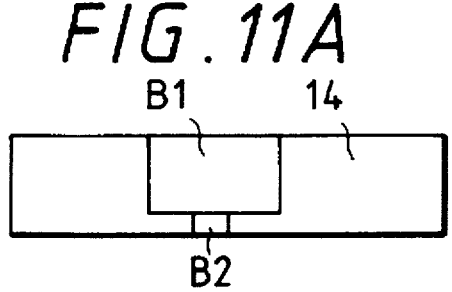
FIGS. 11A to 11G are views showing a method for producing the magnetic head for magnetooptical recording shown in FIGS. 10A and 10B.
Figure 11E:
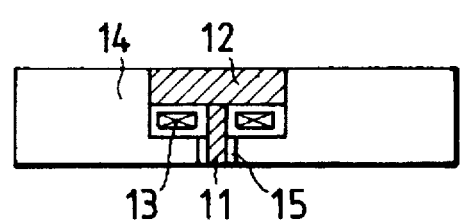
Figure 11B:
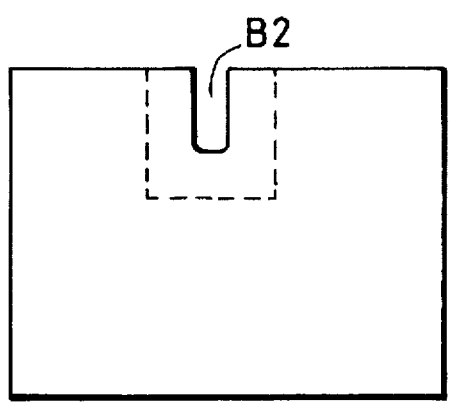

An example of the method for producing a magnetic head shown in FIGS. 10A and 10B is shown in FIGS. 11A to 11G. FIG. 11A shows the slider 14 of a ceramic material after primary working, provided with a recess B1 and a slit B2, which may be formed by mechanical working or by press molding. FIG. 11B is a plan view of the slider seen from below.

Figure 11F:
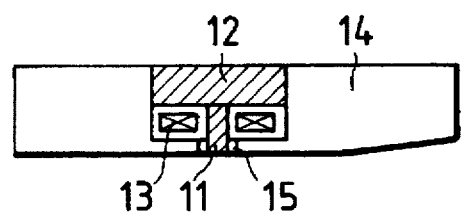
Figure 11C:
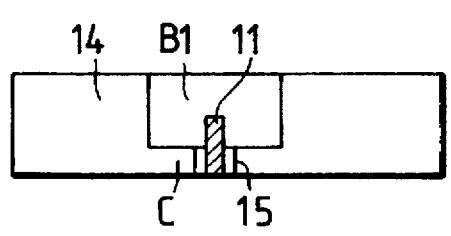

FIG. 11C shows a first step, in which a square rod-shaped main pole 11 composed of a magnetic material of a high magnetic permeability is inserted into the slit B2 of the slider 14 and is bonded to the cover C with glass 15.

Figure 11G:
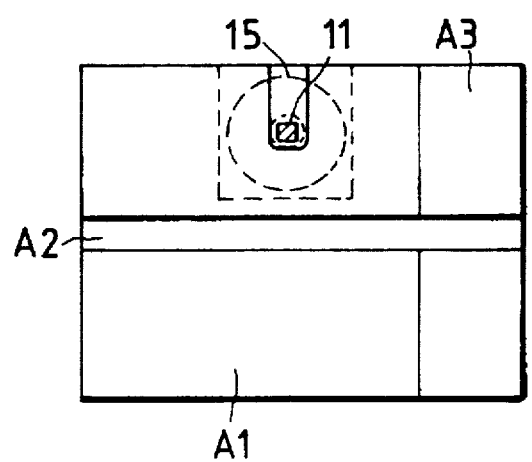
Figure 11D:
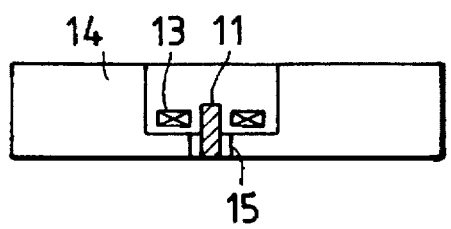

FIG. 11D shows a second step, in which a preformed hollow coil 13 is fitted around the main pole 11 in the recess B1 of the slider 14, and is adhered to the slider 14 and the main pole 11 with adhesive material.

FIG. 11E shows a third step, in which a rectangular plate-shaped base core 12 of a magnetic material of a high magnetic permeability is inserted in the recess B1 of the slider 14 and is bonded by adhesion to the main pole 11.

Then, FIG. 11F shows a step of forming, on the bottom surface of the slider 14, an air bearing structure consisting of a mirror-finished air bearing face A1, a groove A2 and a chamfered face A3. FIG. 11G is a plan view of the member shown in FIG. 11F, seen from below.

[Embodiment 7]

Figure 12A:
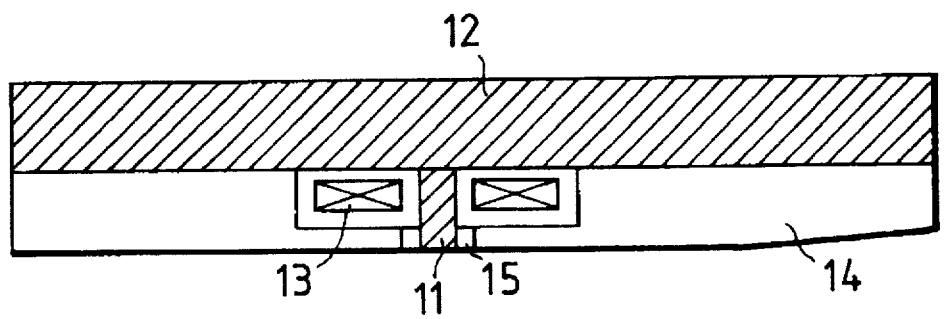
FIGS. 12A and 12B are views showing another configuration of the magnetic head of the present invention for magnetooptical recording.
Figure 12B:
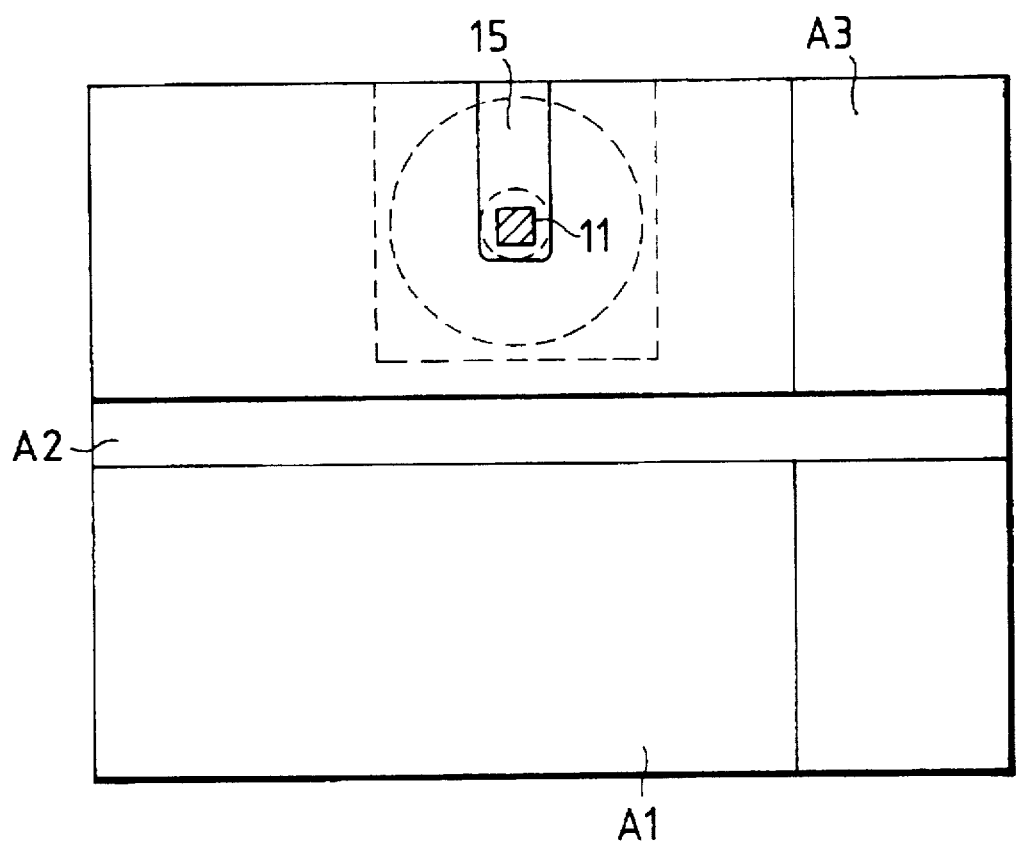

FIGS. 12A and 12B show another embodiment, in which the principal components are similar to those in the foregoing embodiment, but, in the present embodiment, the base core 12 has a size approximately equal to that of the slider 14 and also, serves as the upper half of the slider.

As explained in the foregoing, the magnetic head of the present invention for magnetooptical recording is provided with a cover composed of an antiabrasive ceramic material and formed integrally with the slider, and the cover and the main pole are bonded with hard glass, whereby components of softer resin are not exposed to the air bearing face.

An example of the method for producing the magnetic head shown in FIGS. 12A and 12B is shown in FIGS. 13A to 13G. FIG. 13A shows the slider 14 of a ceramic material, after primary working, provided with a recess B1 and a slit B2, which may be formed by mechanical working or by press molding. FIG. 13B is a plan view of the slider seen from below.

FIG. 13C shows a first step, in which a square rod-shaped main pole 11 composed of a magnetic material of a high magnetic permeability is inserted into the slit B2 of the slider 14 and is bonded to the cover C with glass 15.

FIG. 13D shows a second step, in which a preformed hollow coil 13 is fitted around the main pole 11 in the recess B1 of the slider 14 and is adhered to the slider 14 and the main pole 11 with adhesive material.

FIG. 13E shows a step of forming, on the bottom surface of the slider 14, an air bearing structure consisting of a mirror-finished air bearing face A1, a groove A2 and a chamfered face A3. FIG. 13F is a plan view of the member shown in FIG. 13E, seen from below.

FIG. 13G shows a third step, in which a rectangular plate-shaped base core 12 of a magnetic material of a high magnetic permeability is adhered to the upper surface of the slider 14 and is bonded to the main pole 11. In this operation, for improving the adhesion between the base core 12 and the main pole 11, the upper face of the slider 14 may be mirror polished in advance so as to align with the upper end face of the main pole 11 and the lower face of the base core 12 may also, be mirror polished.

As explained in the foregoing, the magnetic head of the present invention for magnetooptical recording can be produced by a method comprising a step of adhering the main pole to the cover, a step of providing the coil around the main pole and a step of adhering the main pole and the base core, wherein these steps are executed in the above-mentioned sequential order.

Still other embodiments of the magnetic head of the present invention for magnetooptical recording are shown in FIGS. 14A, 14B, 16A and 16B, wherein components the same as those in the embodiments shown in FIGS. 10A and 10B will not be explained further.

[Embodiment 8]

Figure 14A:
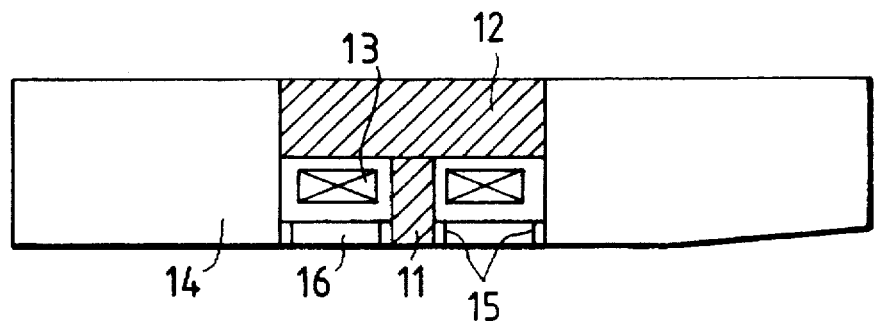
FIGS. 14A and 14B are views showing still another configuration of the magnetic head of the present invention for magnetooptical recording.
Figure 14B:
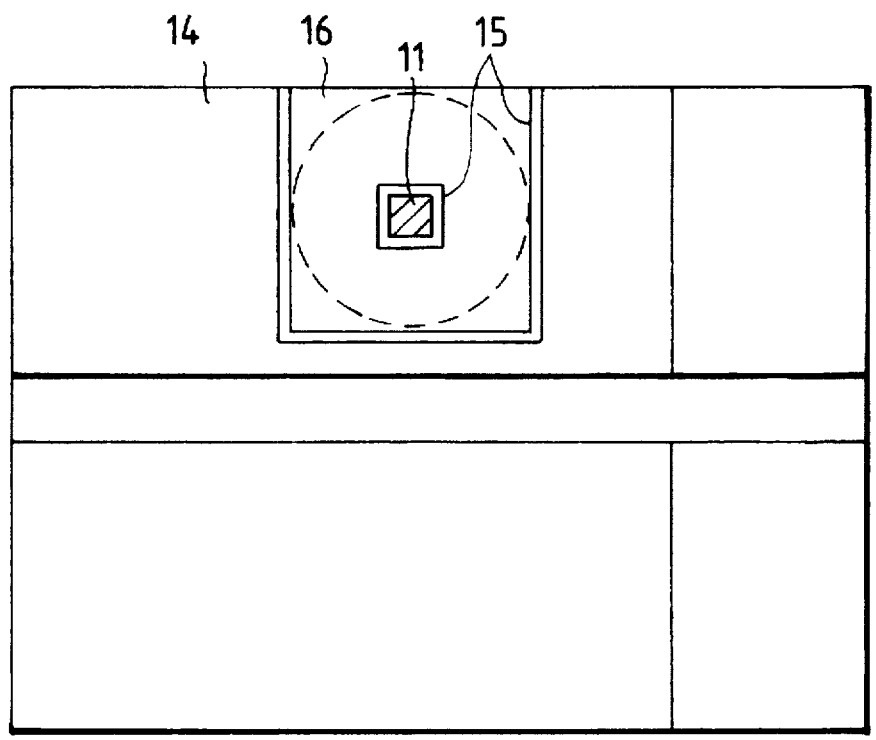

Referring to FIGS. 14A and 14B which are respectively a schematic cross-sectional view and a plan view seen from below, a cover member 16 is made of a ceramic material and has a rectangular shape with a square hole at the center. The cover member 16 is not integral with the slider 14, but is bonded to the slider 14 and the main pole 11 with glass 15.

Figure 15A:
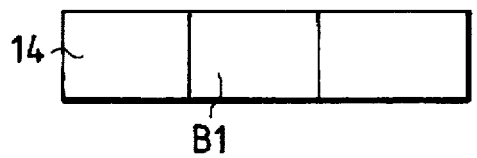
FIGS. 15A to 15H are views showing a method for producing the magnetic head for magnetooptical recording shown in FIGS. 14A and 14B.
Figure 15E:
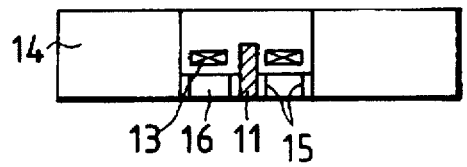
Figure 15B:
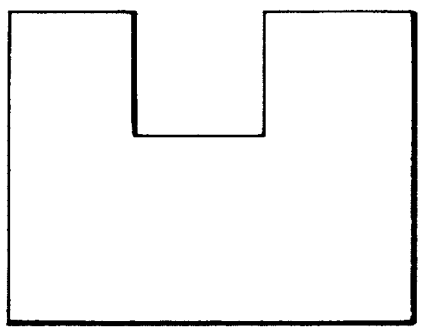

An example of the method for producing such a magnetic head is shown in FIGS. 15A to 15H. FIG. 15A shows the slider 15 of a ceramic material, after primary working, provided with a recess B1, which may be formed by mechanical working or by press molding. FIG. 15B is a plan view of the slider shown in FIG. 15A, seen from below.

Figure 15F:
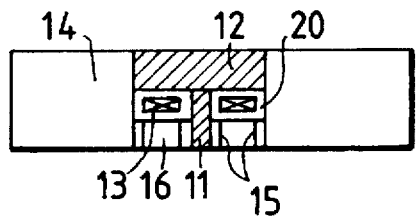
Figure 15C:
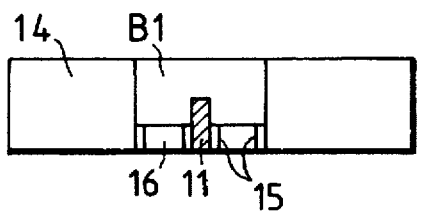

FIG. 15C shows a first step, in which a rectangular rod-shaped main pole 11 of a magnetic material of a high magnetic permeability is inserted into the square hole provided at the center of a rectangular plate-shaped cover member 16 of a ceramic material and is bonded thereto with glass 15. Also, a cover member 16 is inserted into the recess B1 of the slider 14 and bonded thereto with glass 15. FIG. 15D is a plan view of the components shown in FIG. 15C, seen from below.

FIG. 15E shows a second step, in which a preformed hollow coil 13 is fitted around the main pole 11 in the recess B1 of the slider 14 and is adhered to the slider 14, cover member 16 and main pole 11 with adhesive material 20 (cf. FIG. 15F).

Figure 15G:
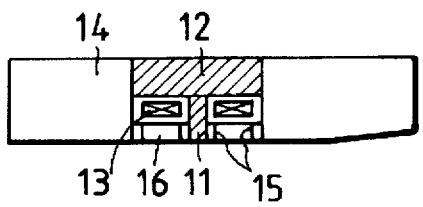
Figure 15D:
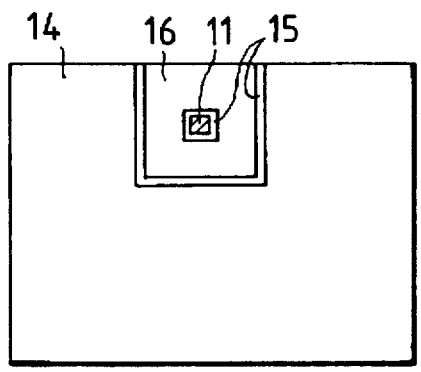

FIG. 15G shows a third step, in which a rectangular plate-shaped base core 12 of a magnetic material of a high magnetic permeability is inserted and adhered in the recess B1 of the slider 14 and bonded to the main pole 11.

Figure 15H:
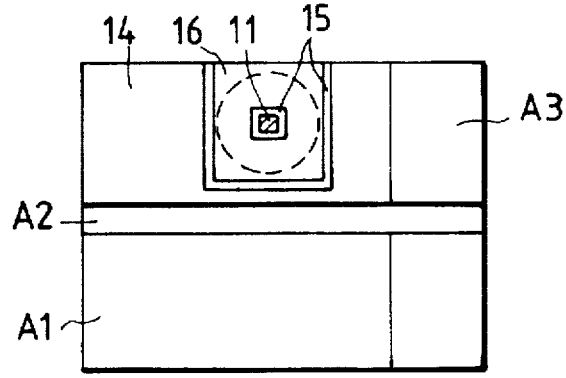

FIG. 15H shows a step of forming, on the bottom surface of the slider 14, an air bearing structure consisting of a mirror-finished air bearing face A1, a groove A2 and a chamfered face A3. FIG. 15H is a plan view, seen from below, of the components shown in FIG. 15G.

[Embodiment 9]

Figure 16A:
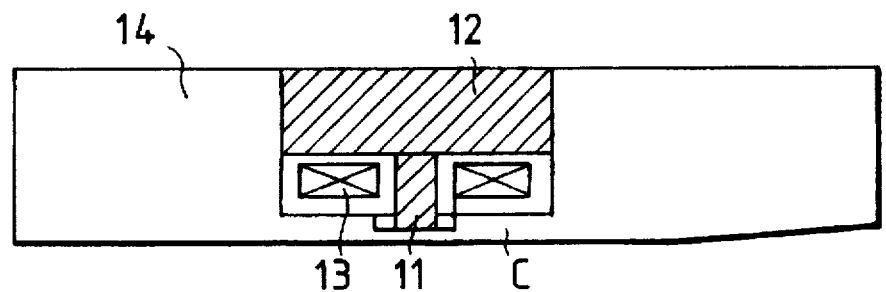
FIGS. 16A and 16B are views showing still another configuration of the magnetic head of the present invention for magnetooptical recording.
Figure 16B:
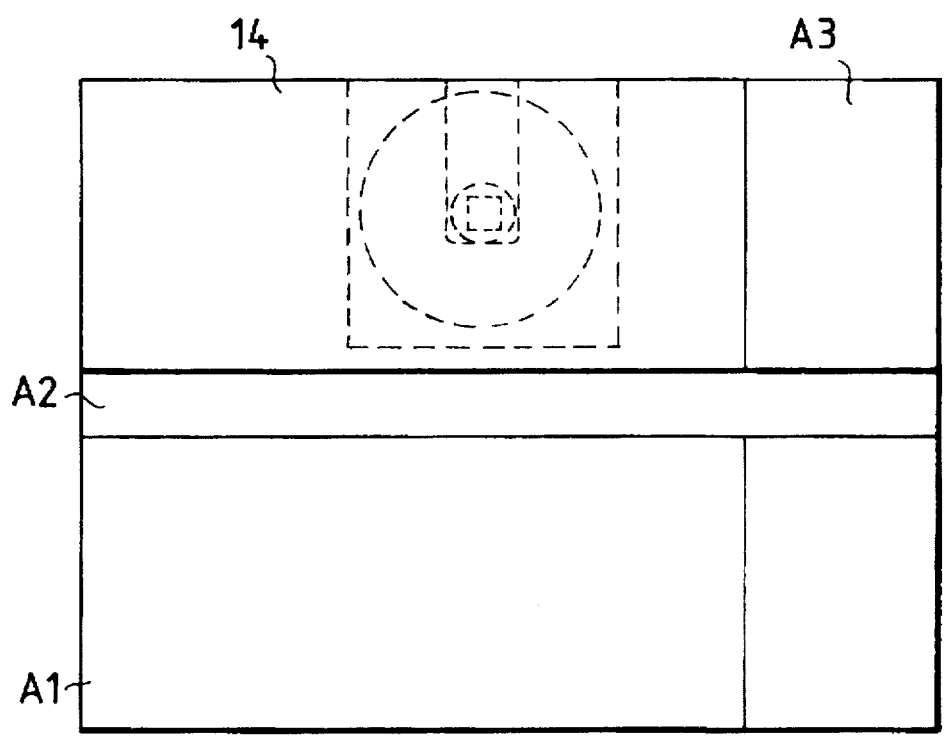

In an embodiment shown in FIGS. 16A and 16B which are respectively a schematic cross-sectional view and a plan view seen from below, the cover C is formed integrally with the slider 14 as in the embodiment shown in FIGS. 10A and 10B, but is so formed as to cover not only the coil 13, but also, the end portion of the main pole 11. Thus, the air bearing face A1 is solely composed of the ceramic materials, without exposure of any other members. The producing method for this embodiment is similar to that of the embodiment shown in FIGS. 9A and 9B and will not, therefore, be explained further.

All the foregoing embodiments are applied to a magnetic head provided with a slider having the air bearing structure for causing the magnetic head to float by air flow. In the following, there will be explained an embodiment in which the magnetic head slides on the disk by a sliding member, instead of the slider mentioned above.

[Embodiment 10]

Figure 17A:
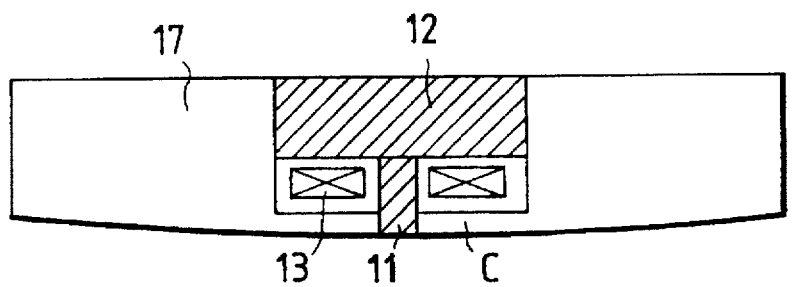
FIGS. 17A and 17B are views showing still another configuration of the magnetic head of the present invention for magnetooptical recording.
Figure 17B:
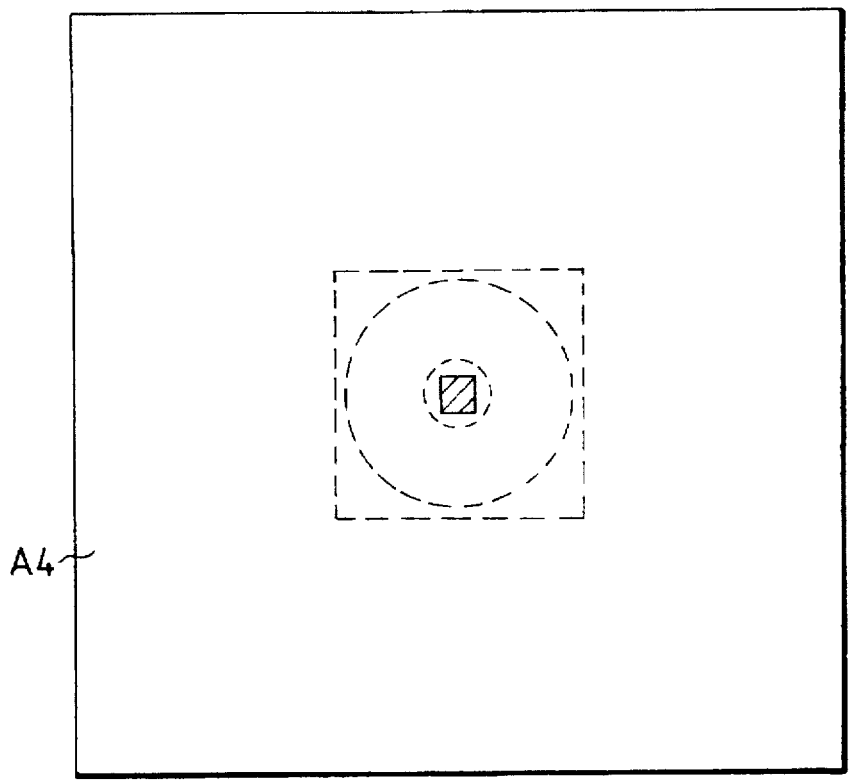

FIGS. 17A and 17B are respectively a schematic cross-sectional view and a plan view, seen from below, showing an example of the configuration of such a magnetic head, wherein the main pole 11, base core 12 and coil 13 are the same as those in the foregoing embodiment and will not, therefore, be explained further.

Referring to FIGS. 17A and 17B, a sliding member 17 is composed of a resinous material with a lubricating property such as POM. A sliding face A4 of the sliding member 17 is given a suitable curved shape. Around the protruding portion of the main pole 11, a cover C is provided integrally with the sliding member 17, so as to cover the coil 13. The sliding member 17 and the main pole 11 are directly bonded by insertion molding.

As described above, the magnetic head of the present invention for magnetooptical recording is provided with the cover which is formed, so as to cover the coil, integrally with the sliding member composed of the resinous material with a lubricating property. Since the sliding member and the main pole are directly bonded by insertion molding, any member composed of non-lubricating thermosetting resin or the like is not exposed on the sliding face.

In the following, there will be explained the method for producing the magnetic head of the above-explained structure. As explained in the foregoing, the sliding member and the main pole are bonded by insertion molding, and the temperature of the resinous material, such as POM, constituting the sliding member in the molten state at the molding is 300° C. to 400° C. On the other hand, the coil can only withstand a temperature of 120° C. to 180° C., so that the step of providing the coil around the main pole has to be executed after the step of bonding and insertion molding of the sliding member and the main pole. Also, for improving the work efficiency by a method of fitting a preformed hollow coil around the main pole, the bonding step for the base core and the main pole has to be conducted after the coil fitting step around the main pole.

Figure 18A:
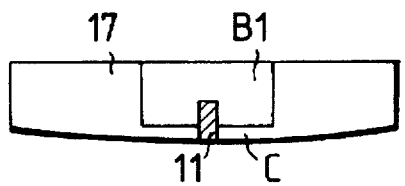
FIGS. 18A to 18E are views showing a method for producing the magnetic head for magnetooptical recording shown in FIGS. 17A and 17B.
Figure 18D:
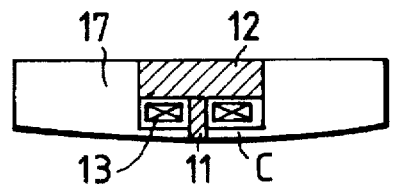
Figure 18B:
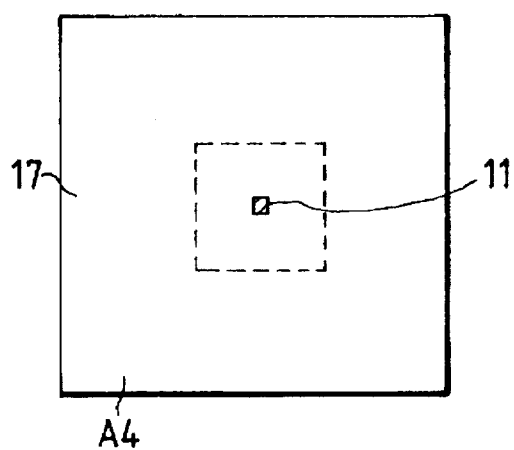

An example of the method for producing the magnetic head shown in FIGS. 17A and 17B, is shown in FIGS. 18A to 18E. FIG. 18A shows a first step in which a sliding member 17, composed of a resinous material such as POM, is insertion molded so as to be bonded with a square rod-shaped main pole 11 composed of a magnetic material of a high magnetic permeability. The sliding member 17 is provided with a curved sliding face A1, a recess B1 and a cover C, and the main pole 11 is so provided in the recess B1 as to be bonded with the cover C. FIG. 18B is a plan view, seen from below, of the components shown in FIG. 18A.

Figure 18E:
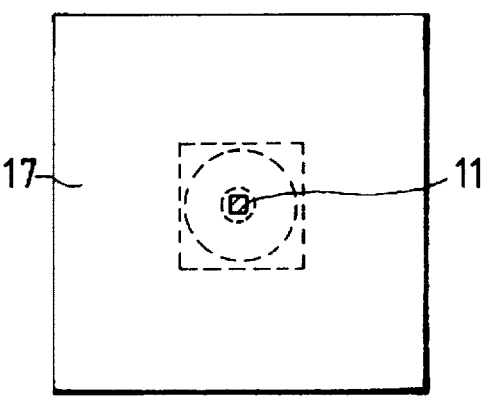
Figure 18C:
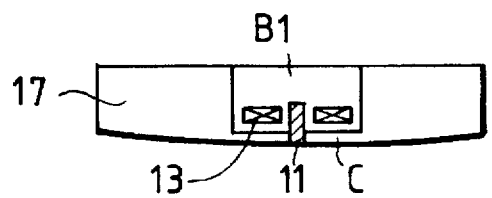

FIG. 18C shows a second step, in which a preformed hollow coil 13 is fitted around the main pole 11 in the recess B1 of the sliding member 17 and is adhered to the sliding member 17 and the main pole 11 with adhesive material.

FIG. 18D shows a third step, in which a square rod-shaped base core 12, composed of a magnetic material of a high magnetic permeability, is inserted and fixed by adhesion to the recess B1 of the sliding member, thereby being bonded to the main pole 11. FIG. 18E is a plan view, seen from below, of the components shown in FIG. 18D.

As explained in the foregoing, the magnetic head of the present invention for magnetooptical recording is produced by a method comprising a step of bonding the main pole to the cover, a step of fitting the coil around the main pole, and a step of bonding the main pole and the base core, wherein these steps are executed in this sequential order.

[Other embodiments]

In the following, there will be explained, with reference to FIGS. 19A to 19H, examples of the configuration of the main pole and the base core in the magnetic head of the present invention for magnetooptical recording.

Figure 19A:
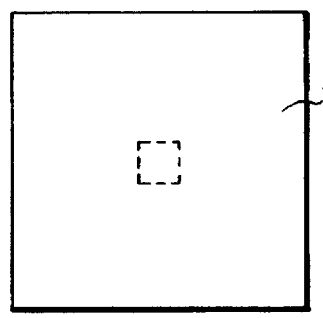
FIGS. 19A to 19H are views showing examples of the configuration of a main pole and a base core in the magnetic head of the present invention for magnetooptical recording.
Figure 19C:
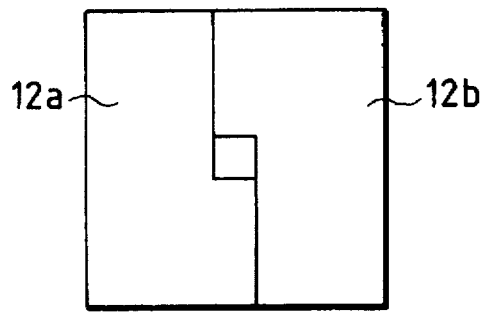
Figure 19B:
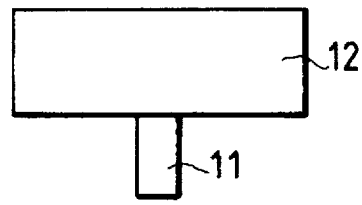

FIGS. 19A and 19B are respectively an upper plan view and a lateral view, showing a configuration consisting of the combination of a square-rod-shaped main pole 11 and a rectangular plate-shaped base core 12, as in the foregoing embodiments.

Figure 19D:
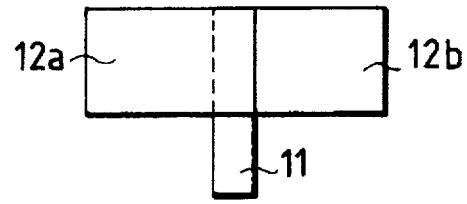

FIGS. 19C and 19D are respectively an upper plan view and a lateral view, showing a configuration in which the base core is composed of two L-shaped members 12a, 12b between which the square rod-shaped main pole 11 is sandwiched.

Figure 19E:
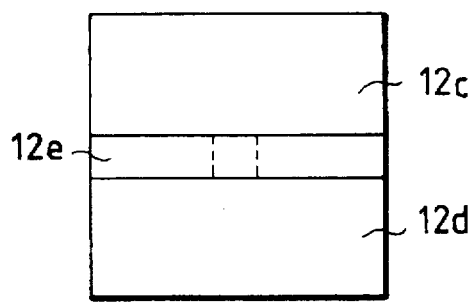
Figure 19G:
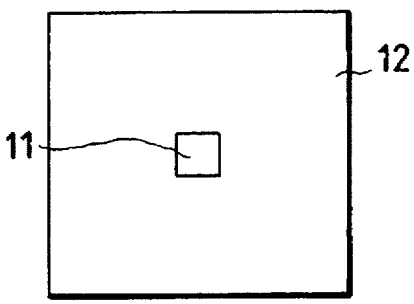
Figure 19F:
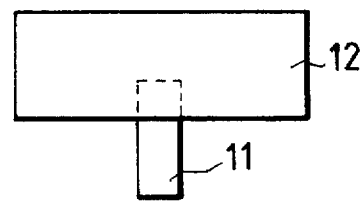

FIGS. 19E and 19F are respectively an upper plan view and a lateral view, showing a configuration in which the base core is composed of two rectangular plate-shaped members 12c, 12d and a square C-shaped member 12e, and the square rod-shaped main pole 11 is inserted into the recess of the member 12e.

Figure 19H:
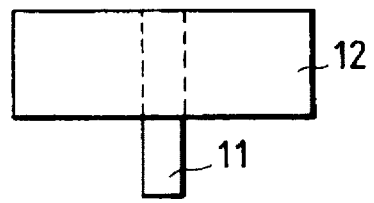

FIGS. 19G and 19H are respectively an upper plan view and a lateral view, showing a configuration in which a square rod-shaped main pole 11 is inserted into a square hole provided at the center of a rectangular plate-shaped base core 12.

Also, there will be explained, with reference to FIGS. 20A to 20F, examples of the shape of the main pole and the base core.

Figure 20A:
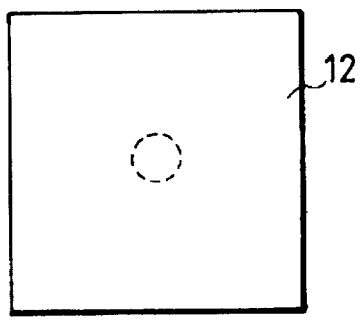
FIGS. 20A to 20F are views showing examples of the shape of the main pole and the base core in the magnetic head of the present invention for magnetooptical recording.
Figure 20B:
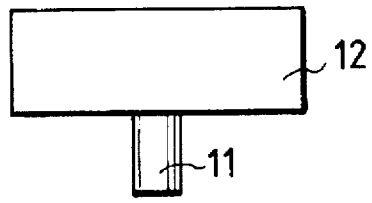

FIGS. 20A and 20B are respectively an upper plan view and a lateral view, showing a configuration in which the base core 12 is formed as a rectangular plate while the main pole 11 is formed in a cylindrical shape.

Figure 20C:
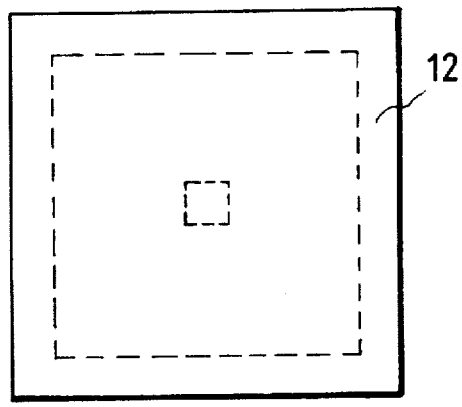
Figure 20D:
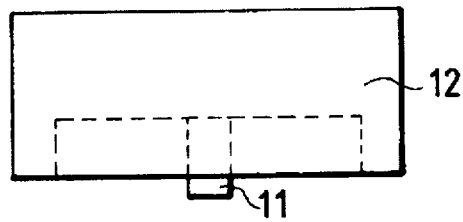

FIGS. 20C and 20D are respectively an upper plan view and a lateral view, showing a configuration in which the rectangular plate-shaped base core 12 has elevated outer edges.

Figure 20E:
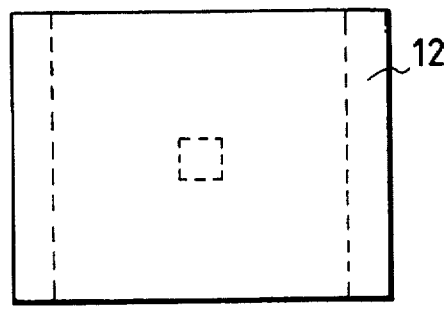
Figure 20F:
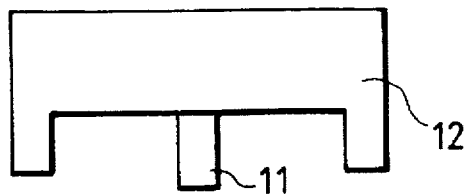

FIGS. 20E and 20F are respectively an upper plan view and a lateral view, showing a configuration in which the rectangular plate-shaped base core 12 has two elevated edges.

What are important in the shape and configuration of the base yoke and the main pole are that the main pole is preferably rod-shaped in order to prepare the magnetic head by at first bonding the main pole to the cover, then fitting the preformed hollow coil around the main pole and then bonding the main pole and the base core, and that the main pole and the base core have to be bonded with satisfactory mutual contact in order to maintain the magnetic coupling. For this purpose, the contacting faces of the main pole and the base core are preferably mirror polished.

Each of the magnetic heads for magnetooptical recording in the foregoing embodiments may be incorporated in an apparatus similar to the conventional one shown in FIG. 2 to constitute a magnetooptical recording apparatus which is provided with means for causing relative motion of the magnetic head for magnetooptical recording and the magnetooptical recording medium, means for generating a magnetic field, modulated with the information recording, by said magnetic head, and an optical head for irradiating the generated portion of said magnetic field with a condensed laser beam and which is free from the head crash phenomenon.

As explained in the foregoing, the magnetic head of the present invention for magnetooptical recording is provided with a thin cover member of a non-magnetic material, in such a manner as to surround the main pole while exposing the top end face thereof and to cover the coil surface, wherein the cover member constitutes an air bearing face or a sliding face at the surface thereof and bears against a coil, composed of a thin film conductor, on the rear surface thereof.

Also, the magnetic head of the present invention for magnetooptical recording is provided with a thin cover member of a non-magnetic material, in such a manner as to cover the upper end face of the main pole and the coil surface, wherein the cover member constitutes an air bearing face or a sliding face at the surface thereof and bears against a coil, composed of a thin film conductor, on the rear surface thereof.

It is therefore possible to minimize or to completely eliminate the exposure of the thermosetting resin, employed as the adhesive material, to the air bearing or sliding face, by sufficiently reducing the gap between the cover member and other components.

Thus, there can be satisfactorily resolved the draw-back in the conventional configuration of abrasion on or damage to the surface of the protecting member consisting of thermosetting resin and exposed to the air bearing or sliding face.

Also, the magnetic head of the present invention for magnetooptical recording provides the advantages of easier manufacturing and lower cost, by forming the air bearing or sliding face on the surface of the cover member and constituting the slider base or the spacer with a metallic or resinous material allowing easy working or molding.

Furthermore, the magnetic head of the present invention for magnetooptical recording provides the ability to effectively dissipate the heat generated in the core and the coil at the generation of the modulated magnetic field of high frequency, thereby preventing the deterioration in the magnetic characteristics resulting from the temperature rise in the core, by forming the air bearing or sliding face on the surface of the cover member and constituting the slider base or the spacer with a metallic material of satisfactory thermal conductivity such as copper or aluminum.

Furthermore, the magnetic head of the present invention for magnetooptical recording enables formation of a more compact coil than by the conventional wire winding, thereby generating a stronger magnetic field with a smaller current supply to the coil and reducing the power consumption in the magnetic head driving circuit, by forming the air bearing or sliding face on the surface of the cover member and also forming the coil with a spiral thin film conductor on the rear surface of the cover member. Besides, as the coil becomes lower in inductance and higher in the magnetic field generating efficiency, the magnetic field can be modulated with a higher frequency and a higher signal recording rate can be attained.

As explained in the foregoing, the magnetic head of the present invention for magnetooptical recording is provided with a cover member with an antiabrasive or a lubricating property so as to cover the coil surface, so that, unlike the conventional magnetic head, no member of insufficient antiabrasive or lubricating property is exposed to the air bearing or sliding face. Consequently, there can be prevented the destruction of the magnetic head by the head crash or by a large frictional force, and a highly reliable magnetooptical recording apparatus can be obtained. Besides, such a magnetic head is excellent in productivity, as it can be produced by a method of fitting a preformed flat coil, prepared with a conductor wire, around the main pole. Furthermore, by providing a flat coil close to the air bearing or sliding face, it is rendered possible to reduce the coil inductance and to improve the magnetic field generating efficiency, thereby achieving magnetic field modulation with a higher frequency and a higher signal recording rate.

What is claimed is:

1. A magnetic head for magnetooptical recording comprising:

a slider base;

a core comprising a magnetic material, mounted on said slider base, said core having a main pole;

a thin plate-shaped cover member which surrounds the periphery of said main pole, an upper end face of which is exposed, said cover member being composed of an antiabrasive material and a front surface of said cover member being arranged to face a magnetooptical recording medium; and a coil composed of a thin film conductor formed on a rear surface of said cover member, said coil being formed spirally by patterning.

2. A magnetic head according to claim 1, wherein said slider base is composed of a material selected from metal and a resinous material.

3. A magnetic head according to claim 1, wherein said slider base and said core are integrally composed of a magnetic material.

4. A magnetic head according to claim 1, further comprising:

a spacer provided between said core and said cover member.

5. A magnetic head according to claim 4, wherein said spacer is composed of a material selected from metal and a resinous material.

6. A magnetic head according to claim 1, wherein said cover member is composed of one of a non-magnetic ceramic material, a non-magnetic ferrite and a glassy carbon.

7. A magnetic head according to claim 1, wherein said cover member is composed of at least two members, wherein the member at the surface side and the member at the rear surface side are composed of mutually different materials.

8. A magnetooptical recording apparatus comprising:

an optical head for irradiating a magnetooptical recording medium with a light beam; and a magnetic head for applying a magnetic field modulated by an information signal to the recording medium, said magnetic head comprising:
(1) a slider base;
(2) a core comprising a magnetic material mounted on said slider base, said core having a main pole;
(3) a thin plate-shaped cover member which surrounds the periphery of said main pole, an upper end surface of which is exposed, said cover member being composed of an antiabrasive material add a front surface of said cover member being arranged to face a magnetooptical recording medium; and
(4) a coil composed of a thin film conductor formed on a rear surface of said cover member, said coil being formed spirally by patterning.

9. A magnetic head for magnetooptical recording comprising:

a slider base;

a core comprising a magnetic material mounted on said slider base, said core having a main pole;

a thin plate-shaped cover member which covers an upper end face of said main pole, said cover member being composed of an antiabrasive material and a front surface of said cover member being arranged to face a magnetooptical recording medium; and a coil composed of a thin film conductor formed on a rear surface of said cover member, said coil being formed spirally by patterning.

10. A magnetic head according to claim 9, wherein said slider base is composed of a material selected from metal and a resinous material.

11. A magnetic head according to claim 9, wherein said cover member is composed of one of a non-magnetic ceramic material, a non-magnetic ferrite and a glassy carbon.

12. A magnetooptical recording apparatus comprising:

an optical head for irradiating a magnetooptical recording medium with a light beam; and a magnetic head for applying a magnetic field modulated by an information signal to the recording medium, said magnetic head comprising:
(1) a slider base;
(2) a core comprising a magnetic material mounted on said slider base, said core having a main pole;
(3) a thin plate-shaped cover member which covers an upper end face of said main pole, said cover member being composed of an antiabrasive material and a front surface of said cover member being arranged to face a magnetooptical recording medium; and
(4) a coil composed of a thin film conductor formed on a rear surface of said cover member, said coil being formed spirally by patterning.

13. A magnetic head according to claim 1, wherein the surface facing the magnetooptical recording medium is one of an air bearing surface and a sliding surface.

14. A magnetooptical recording apparatus according to claim 8, wherein the surface facing the magnetooptical recording medium is one of an air bearing surface and a sliding surface.

15. A magnetic head according to claim 9, wherein the surface facing the magnetooptical recording medium is one of an air bearing surface and a sliding surface.

16. A magnetooptical recording apparatus according to claim 12, wherein the surface facing the magnetooptical recording medium is one of an air bearing surface and a sliding surface.

* * * * *

UNITED STATES PATENT AND TRADEMARK OFFICE
CERTIFICATE OF CORRECTION

PATENT NO. : 5,703,839
DATED : December 30, 1997
INVENTOR(S) : KAZUYOSHI ISHII

It is certified that error appears in the above-identified patent and that said Letters Patent is hereby corrected as shown below:

ON THE COVER PAGE:

Under "OTHER PUBLICATIONS," item [56]

"Perpendilular" should read --Perpendicular--.

COLUMN 2:

Line 55, "case" should read --a case--.

COLUMN 7:

Line 51, "On" should read --On--.

COLUMN 15:

Line 38, "add" should read --and--.

Signed and Sealed this

Fourteenth Day of July, 1998

Attest:

BRUCE LEHMAN

*Attesting Officer*  *Commissioner of Patents and Trademarks*